(12) United States Patent
Dougherty, III et al.

(10) Patent No.: US 8,897,377 B2
(45) Date of Patent: Nov. 25, 2014

(54) TRANSCODING MULTIPLE MEDIA ELEMENTS FOR INDEPENDENT WIRELESS DELIVERY

(75) Inventors: James F. Dougherty, III, Morgan Hill, CA (US); Yasantha N. Rajakarunanayake, San Ramon, CA (US); Alexander G. MacInnis, Los Altos, CA (US); James D. Bennett, Hroznetin (CZ); Jeyhan Karaoguz, Irvine, CA (US)

(73) Assignee: Broadcom Corporation, Irvine, CA (US)

(*) Notice: Subject to any disclaimer, the term of this patent is extended or adjusted under 35 U.S.C. 154(b) by 574 days.

(21) Appl. No.: 13/220,601

(22) Filed: Aug. 29, 2011

(65) Prior Publication Data

US 2011/0310995 A1  Dec. 22, 2011

Related U.S. Application Data

(63) Continuation-in-part of application No. 12/982,199, filed on Dec. 30, 2010, and a continuation-in-part of application No. 12/982,330, filed on Dec. 30, 2010.

(60) Provisional application No. 61/491,838, filed on May 31, 2011, provisional application No. 61/303,119, filed on Feb. 10, 2010, provisional application No. 61/291,818, filed on Dec. 31, 2009.

(51) Int. Cl.

| | |
|---|---|
| H04N 7/12 | (2006.01) |
| H04N 21/41 | (2011.01) |
| H04N 21/435 | (2011.01) |
| G02B 27/22 | (2006.01) |
| H04N 21/235 | (2011.01) |
| G09G 3/20 | (2006.01) |
| H04N 21/4363 | (2011.01) |
| G09G 3/00 | (2006.01) |

(52) U.S. Cl.
CPC ............. *G09G 3/20* (2013.01); *H04N 21/4122* (2013.01); *H04N 21/435* (2013.01); *G02B 27/22* (2013.01); *H04N 21/235* (2013.01); *G02B 27/2228* (2013.01); *H04N 21/43637* (2013.01); *G09G 3/003* (2013.01)
USPC .................................................. 375/240.26

(58) Field of Classification Search
USPC ..................................................... 375/240.26
See application file for complete search history.

(56) References Cited

U.S. PATENT DOCUMENTS

| | | | | |
|---|---|---|---|---|
| 7,877,400 | B1* | 1/2011 | Marcus ........................ | 707/758 |
| 2002/0178278 | A1* | 11/2002 | Ducharme .................... | 709/231 |
| 2003/0156543 | A1* | 8/2003 | Sahinoglu et al. ........... | 370/238 |
| 2009/0144811 | A1* | 6/2009 | Matsubara et al. ............... | 726/5 |
| 2010/0097926 | A1* | 4/2010 | Huang et al. .................. | 370/219 |

* cited by examiner

*Primary Examiner* — Dave Czekaj
*Assistant Examiner* — Tracy Li
(74) *Attorney, Agent, or Firm* — Garlick & Markison; Shayne X. Short

(57) ABSTRACT

Transcoding multiple media elements for independent wireless delivery. Respective media or multimedia elements are selectively and respectively encoded and/or transcoded. Such respective and selective processing of different media elements provides for their unbundled and independent communication to one or more other devices. In one instance, different respective overlays of a display (e.g., a computer, TV, PDA display, etc.) are respectively and selectively transcoded and/or encoded to generate different respective streams that may each be handled differently as a function of any number of parameters (e.g., media element type, content, communication channel characteristic, source proximity, priority, etc.). Different types of media elements include photo/image, video, graphics, text, audio, picture-in-picture, two-dimensional (2D), three-dimensional (3D), and/or other types of media elements as may be included within a given configuration of a display. Each respective encoding and/or transcoding may be particularly optimized or tailored for a given media element type.

22 Claims, 17 Drawing Sheets

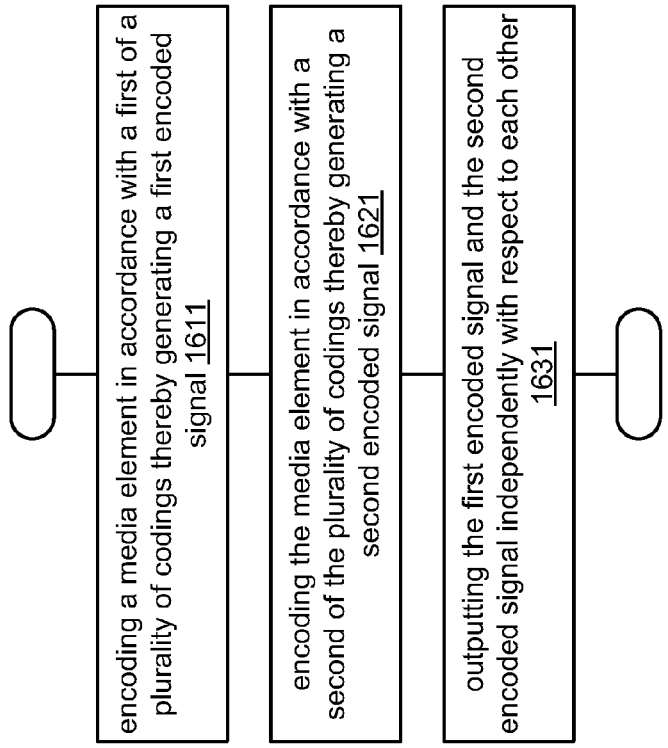
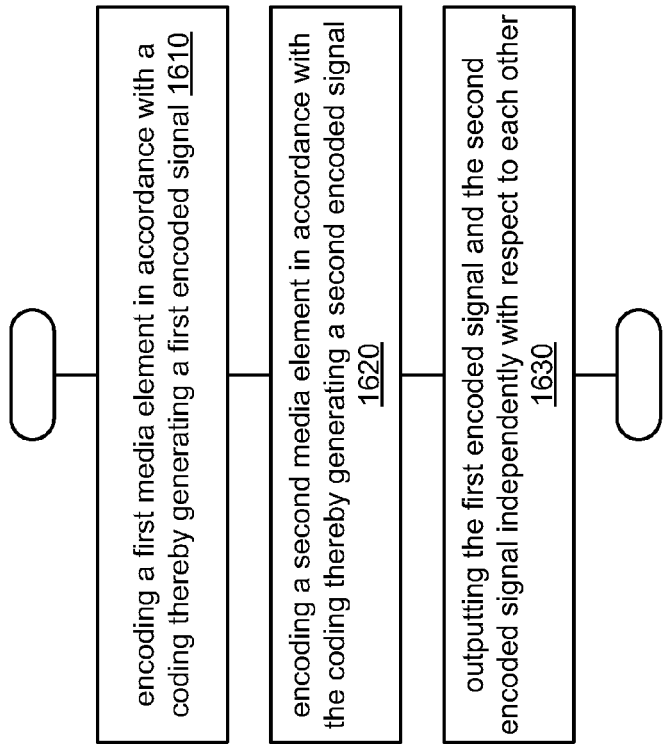

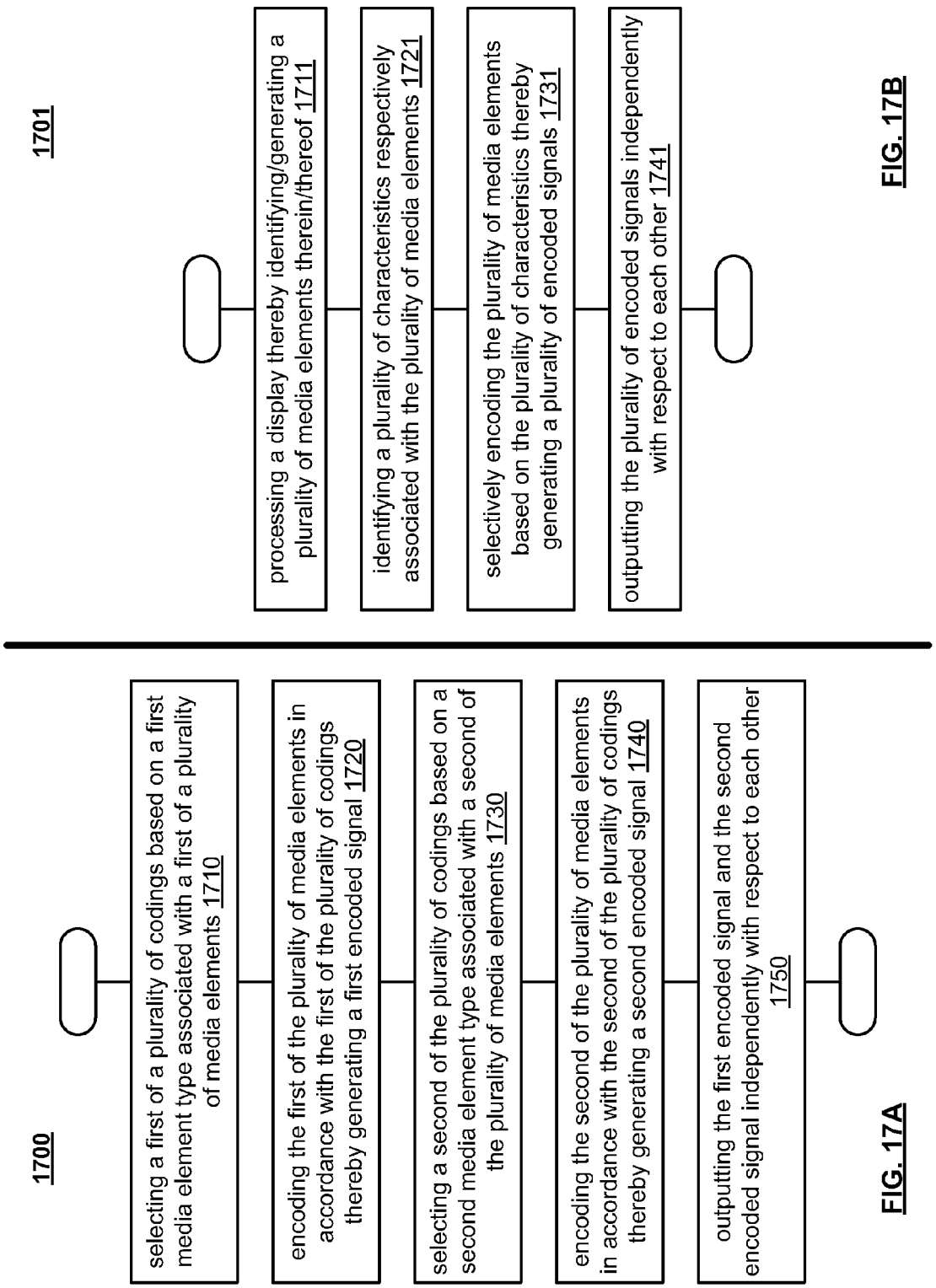

TRANSCODING MULTIPLE MEDIA ELEMENTS FOR INDEPENDENT WIRELESS DELIVERY

CROSS REFERENCE TO RELATED PATENTS/PATENT APPLICATIONS

Provisional Priority Claims

The present U.S. Utility Patent Application claims priority pursuant to 35 U.S.C. §119(e) to the following U.S. Provisional Patent Application which is hereby incorporated herein by reference in its entirety and made part of the present U.S. Utility Patent Application for all purposes:

1. U.S. Provisional Patent Application Ser. No. 61/491,838, entitled "Media communications and signaling within wireless communication systems," filed May 31, 2011.

Continuation-in-Part (CIP) Priority Claims, 35 U.S.C. §120

The present U.S. Utility Patent Application claims priority pursuant to 35 U.S.C. §120, as a continuation-in-part (CIP), to the following U.S. Utility Patent Application which is hereby incorporated herein by reference in its entirety and made part of the present U.S. Utility Patent Application for all purposes:

1. U.S. Utility patent application Ser. No. 12/982,199, entitled "Transcoder supporting selective delivery of 2D, stereoscopic 3D, and multi-view 3D content from source video," filed Dec. 30, 2010, pending, which claims priority pursuant to 35 U.S.C. §119(e) to the following U.S. Provisional Patent Applications which are hereby incorporated herein by reference in their entirety and made part of the present U.S. Utility Patent Application for all purposes:
  1.1. U.S. Provisional Patent Application Ser. No. 61/291,818, entitled "Adaptable image display," filed Dec. 31, 2009.
  1.2. U.S. Provisional Patent Application Ser. No. 61/303,119, entitled "Adaptable image display," filed Feb. 10, 2010.

The present U.S. Utility Patent Application also claims priority pursuant to 35 U.S.C. §120, as a continuation-in-part (CIP), to the following U.S. Utility Patent Application which is hereby incorporated herein by reference in its entirety and made part of the present U.S. Utility Patent Application for all purposes:

2. U.S. Utility patent application Ser. No. 12/982,330, entitled "Multi-path and multi-source 3D content storage, retrieval, and delivery," filed Dec. 30, 2010, pending, which claims priority pursuant to 35 U.S.C. §119(e) to the following U.S. Provisional Patent Applications which are hereby incorporated herein by reference in their entirety and made part of the present U.S. Utility Patent Application for all purposes:
  2.1. U.S. Provisional Patent Application Ser. No. 61/291,818, entitled "Adaptable image display," filed Dec. 31, 2009.
  2.2. U.S. Provisional Patent Application Ser. No. 61/303,119, entitled "Adaptable image display," filed Feb. 10, 2010.

Incorporation by Reference

The following standards/draft standards are hereby incorporated herein by reference in their entirety and are made part of the present U.S. Utility Patent Application for all purposes:

1. "WD3: Working Draft 3 of High-Efficiency Video Coding, Joint Collaborative Team on Video Coding (JCT-VC)," of ITU-T SG16 WP3 and ISO/IEC JTC1/SC29/WG11, Thomas Wiegand, et al., $5^{th}$ Meeting: Geneva, CH, 16-23 Mar., 2011, Document: JCTVC-E603, 215 pages.

2. International Telecommunication Union, ITU-T, TELECOMMUNICATION STANDARDIZATION SECTOR OF ITU, H.264 (03/2010), SERIES H: AUDIOVISUAL AND MULTIMEDIA SYSTEMS, Infrastructure of audiovisual services—Coding of moving video, Advanced video coding for generic audiovisual services, Recommendation ITU-T H.264, also alternatively referred to as International Telecomm ISO/IEC 14496-10—MPEG-4 Part 10, AVC (Advanced Video Coding), H.264/MPEG-4 Part 10 or AVC (Advanced Video Coding), ITU H.264/MPEG4-AVC, or equivalent.

Incorporation by Reference

The following IEEE standards/draft IEEE standards are hereby incorporated herein by reference in their entirety and are made part of the present U.S. Utility Patent Application for all purposes:

1. IEEE Std 802.11™—2007, "IEEE Standard for Information technology—Telecommunications and information exchange between systems—Local and metropolitan area networks—Specific requirements; Part 11: Wireless LAN Medium Access Control (MAC) and Physical Layer (PHY) Specifications," IEEE Computer Society, IEEE Std 802.11™-2007, (Revision of IEEE Std 802.11-1999), 1233 pages.

2. IEEE Std 802.11n™—2009, "IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput," IEEE Computer Society, IEEE Std 802.11n™-2009, (Amendment to IEEE Std 802.11™-2007 as amended by IEEE Std 802.11k™—2008, IEEE Std 802.11r™—2008, IEEE Std 802.11y™—2008, and IEEE Std 802.11r™—2009), 536 pages.

3. IEEE P802.11ac™/D1.1, August 2011, "Draft STANDARD for Information Technology—Telecommunications and information exchange between systems—Local and metropolitan area networks—Specific requirements, Part 11: Wireless LAN Medium Access Control (MAC) and Physical Layer (PHY) specifications, Amendment 5: Enhancements for Very High Throughput for Operation in Bands below 6 GHz," Prepared by the 802.11 Working Group of the 802 Committee, 297 total pages (pp. i-xxiii, 1-274).

BACKGROUND OF THE INVENTION

1. Technical Field of the Invention

The invention relates generally to communication systems; and, more particularly, it relates to independent and selective coding/transcoding of media (or multimedia) elements within such communication systems including independent wireless delivery thereof.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11x, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies them. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier (PA). The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Typically, the transmitter will include one antenna for transmitting the RF signals, which are received by a single antenna, or multiple antennae (alternatively, antennas), of a receiver. When the receiver includes two or more antennae, the receiver will select one of them to receive the incoming RF signals. In this instance, the wireless communication between the transmitter and receiver is a single-output-single-input (SISO) communication, even if the receiver includes multiple antennae that are used as diversity antennae (i.e., selecting one of them to receive the incoming RF signals). For SISO wireless communications, a transceiver includes one transmitter and one receiver. Currently, most wireless local area networks (WLAN) that are IEEE 802.11, 802.11a, 802.11b, or 802.11g employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennae and two or more receiver paths. Each of the antennae receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennae to a receiver. The receiver includes a single receiver path that receives the multiple RF signals from the transmitter. In this instance, the receiver uses beam forming to combine the multiple RF signals into one signal for processing.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

With the various types of wireless communications (e.g., SISO, MISO, SIMO, and MIMO), and particularly within communication devices that may employ multiple communication paths therein, the present art does not provide an adequate solution by which various communications maybe performed and operated in a communication device without deleterious affecting one another.

In the context of wireless communications and particularly the transmission and receipt of signals therein that include media content (e.g., video, audio, etc.), certain considerations should be made that are not necessary within non-media related signaling. For example, certain non-media related signals do not suffer significant degradation of performance from latency, delay, etc. Often times, such media related content communications are relatively more time critical than non-media related content communications. Particularly in the context of wireless communications, the present art does not provide an adequate means by which media related content communications may be effectuated in a robust, reliable, and perceptually acceptable manner.

BRIEF DESCRIPTION OF THE SEVERAL VIEWS OF THE DRAWINGS

FIG. 15A, FIG. 15B, FIG. 16A, FIG. 16B, FIG. 17A, and FIG. 17B illustrate various embodiment of methods as may be performed in accordance with operation of various devices such as various wireless communication devices operative to perform encoding and/or transcoding of media signals including respective media elements therein.

DETAILED DESCRIPTION OF THE INVENTION

Figure 1:
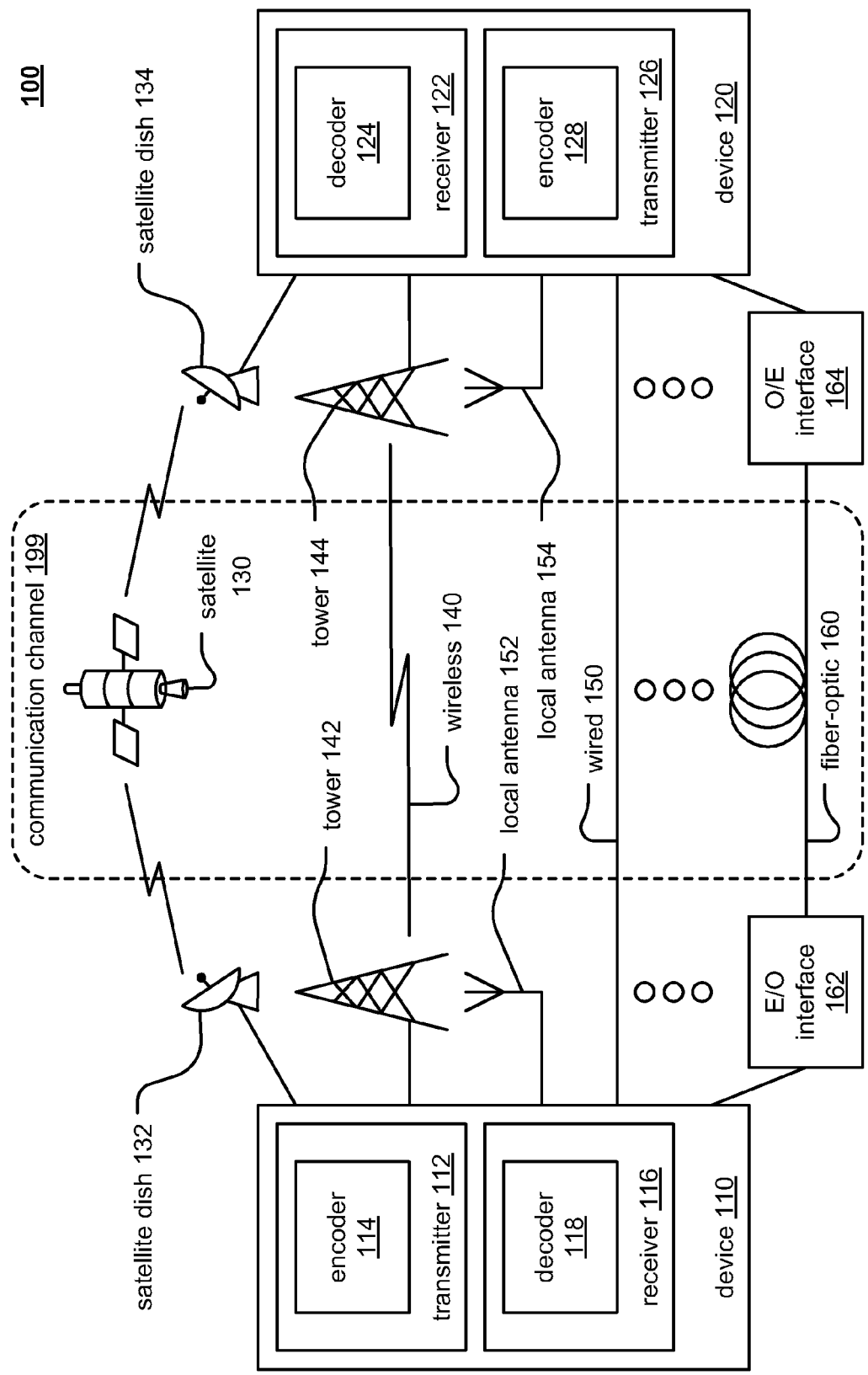
FIG. 1 and FIG. 2 are diagrams illustrating various embodiments of communication systems.

Within communication systems, signals are transmitted between various communication devices therein. The goal of digital communications systems is to transmit digital data from one location, or subsystem, to another either error free or with an acceptably low error rate. As shown in FIG. 1, data may be transmitted over a variety of communications channels in a wide variety of communication systems: magnetic media, wired, wireless, fiber, copper, and other types of media as well.

Figure 2:
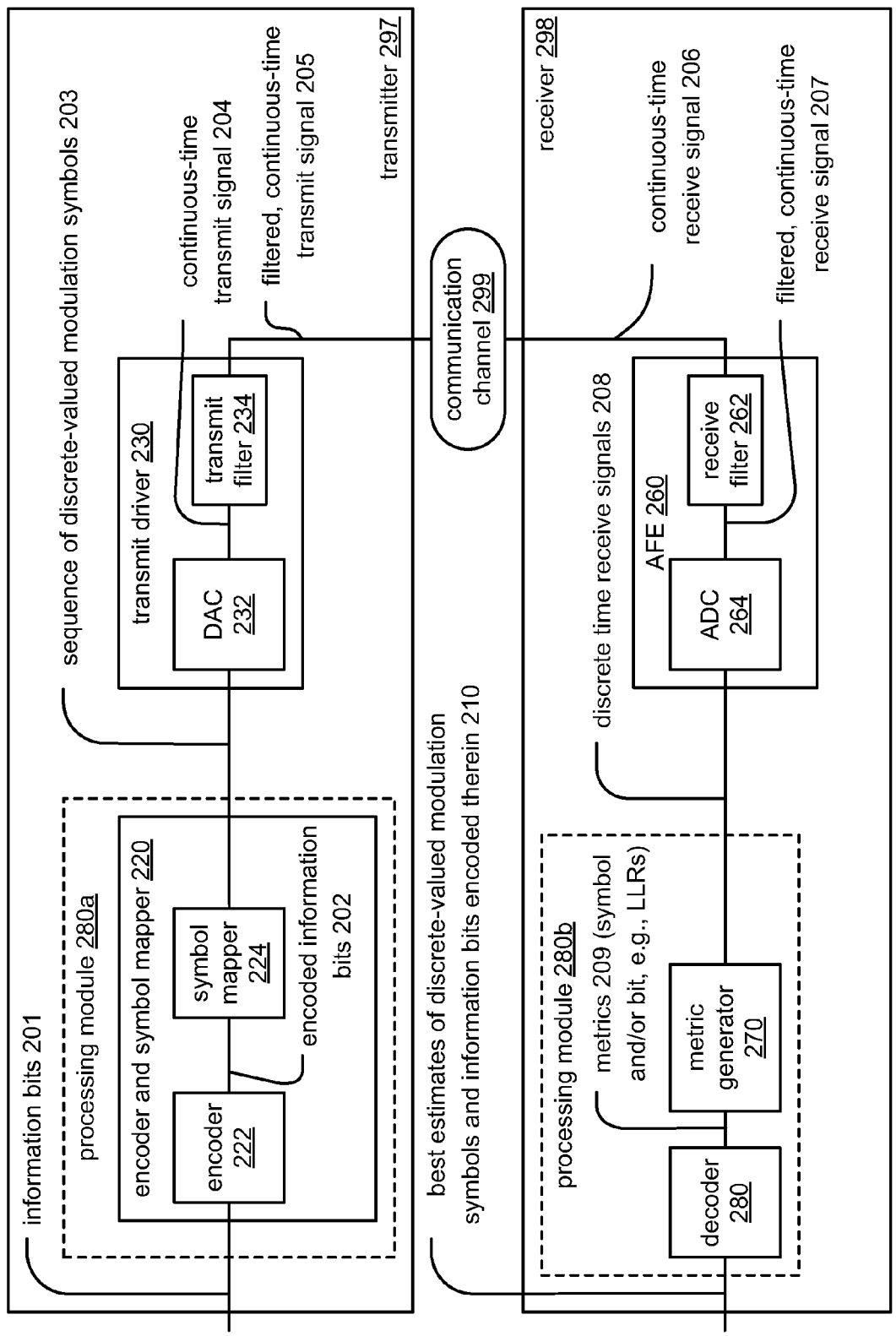

FIG. 1 and FIG. 2 are diagrams illustrating various embodiments of communication systems, 100, and 200, respectively.

Referring to FIG. 1, this embodiment of a communication system 100 is a communication channel 199 that communicatively couples a communication device 110 (including a transmitter 112 having an encoder 114 and including a receiver 116 having a decoder 118) situated at one end of the communication channel 199 to another communication device 120 (including a transmitter 126 having an encoder 128 and including a receiver 122 having a decoder 124) at the other end of the communication channel 199. In some embodiments, either of the communication devices 110 and 120 may only include a transmitter or a receiver. There are several different types of media by which the communication channel 199 may be implemented (e.g., a satellite communication channel 130 using satellite dishes 132 and 134, a wireless communication channel 140 using towers 142 and 144 and/or local antennae 152 and 154, a wired communication channel 150, and/or a fiber-optic communication channel 160 using electrical to optical (E/O) interface 162 and optical to electrical (O/E) interface 164)). In addition, more than one type of media may be implemented and interfaced together thereby forming the communication channel 199.

To reduce transmission errors that may undesirably be incurred within a communication system, error correction and channel coding schemes are often employed. Generally, these error correction and channel coding schemes involve the use of an encoder at the transmitter end of the communication channel 199 and a decoder at the receiver end of the communication channel 199.

Any of various types of ECC codes described can be employed within any such desired communication system (e.g., including those variations described with respect to FIG. 1), any information storage device (e.g., hard disk drives (HDDs), network information storage devices and/or servers, etc.) or any application in which information encoding and/or decoding is desired.

Generally speaking, when considering a communication system in which video data is communicated from one location, or subsystem, to another, video data encoding may generally be viewed as being performed at a transmitting end of the communication channel 199, and video data decoding may generally be viewed as being performed at a receiving end of the communication channel 199.

Also, while the embodiment of this diagram shows bi-directional communication being capable between the communication devices 110 and 120, it is of course noted that, in some embodiments, the communication device 110 may include only video data encoding capability, and the communication device 120 may include only video data decoding capability, or vice versa (e.g., in a uni-directional communication embodiment such as in accordance with a video broadcast embodiment).

Referring to the communication system 200 of FIG. 2, at a transmitting end of a communication channel 299, information bits 201 (e.g., corresponding particularly to video data in one embodiment) are provided to a transmitter 297 that is operable to perform encoding of these information bits 201 using an encoder and symbol mapper 220 (which may be viewed as being distinct functional blocks 222 and 224, respectively) thereby generating a sequence of discrete-valued modulation symbols 203 that is provided to a transmit driver 230 that uses a DAC (Digital to Analog Converter) 232 to generate a continuous-time transmit signal 204 and a transmit filter 234 to generate a filtered, continuous-time transmit signal 205 that substantially comports with the communication channel 299. At a receiving end of the communication channel 299, continuous-time receive signal 206 is provided to an AFE (Analog Front End) 260 that includes a receive filter 262 (that generates a filtered, continuous-time receive signal 207) and an ADC (Analog to Digital Converter) 264 (that generates discrete-time receive signals 208). A metric generator 270 calculates metrics 209 (e.g., on either a symbol and/or bit basis) that are employed by a decoder 280 to make best estimates of the discrete-valued modulation symbols and information bits encoded therein 210.

Within each of the transmitter 297 and the receiver 298, any desired integration of various components, blocks, functional blocks, circuitries, etc. therein may be implemented. For example, this diagram shows a processing module 280*a* as including the encoder and symbol mapper 220 and all associated, corresponding components therein, and a processing module 280 is shown as including the metric generator 270 and the decoder 280 and all associated, corresponding components therein. Such processing modules 280*a* and 280*b* may be respective integrated circuits. Of course, other boundaries and groupings may alternatively be performed without departing from the scope and spirit of the invention. For example, all components within the transmitter 297 may be included within a first processing module or integrated circuit, and all components within the receiver 298 may be included within a second processing module or integrated circuit. Alternatively, any other combination of components within each of the transmitter 297 and the receiver 298 may be made in other embodiments.

As with the previous embodiment, such a communication system 200 may be employed for the communication of video data is communicated from one location, or subsystem, to another (e.g., from transmitter 297 to the receiver 298 via the communication channel 299).

Figure 3:
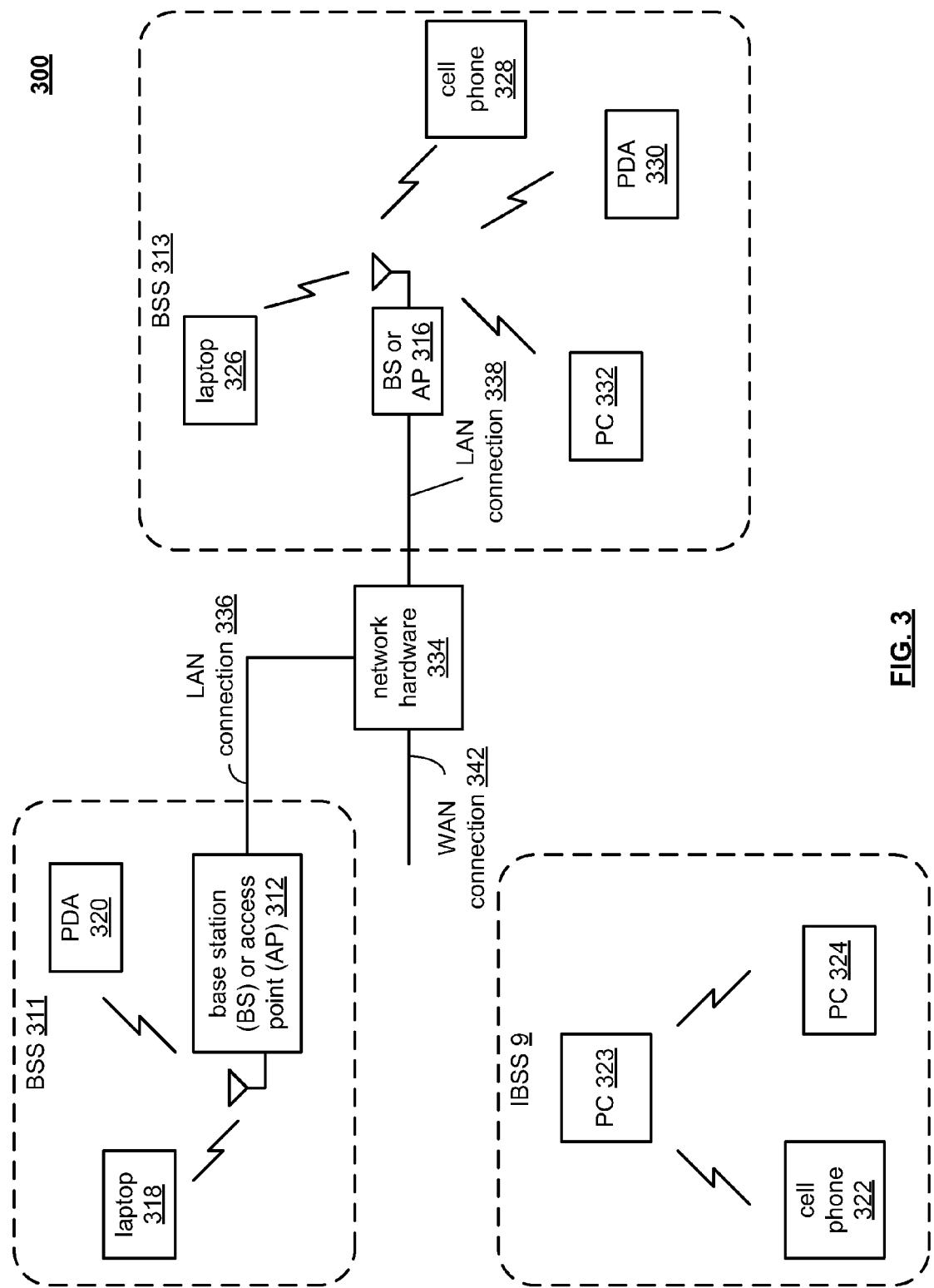
FIG. 3 is a diagram illustrating an alternative embodiment of a wireless communication system.

FIG. 3 is a diagram illustrating an embodiment of a wireless communication system 300. The wireless communication system 300 includes a plurality of base stations and/or access points 312, 316, a plurality of wireless communication devices 318-332 and a network hardware component 334. Note that the network hardware 334, which may be a router, switch, bridge, modem, system controller, etc., provides a wide area network connection 342 for the communication system 300. Further note that the wireless communication devices 318-332 may be laptop host computers 318 and 326, personal digital assistant hosts 320 and 330, personal computer hosts 324 and 332 and/or cellular telephone hosts 322 and 328.

Wireless communication devices 322, 323, and 324 are located within an independent basic service set (IBSS) area and communicate directly (i.e., point to point). In this configuration, these devices 322, 323, and 324 may only communicate with each other. To communicate with other wireless communication devices within the system 300 or to communicate outside of the system 300, the devices 322, 323, and/or 324 need to affiliate with one of the base stations or access points 312 or 316.

The base stations or access points 312, 316 are located within basic service set (BSS) areas 311 and 313, respectively, and are operably coupled to the network hardware 334 via local area network connections 336, 338. Such a connection provides the base station or access point 312-316 with connectivity to other devices within the system 300 and provides connectivity to other networks via the WAN connection 342. To communicate with the wireless communication devices within its BSS 311 or 313, each of the base stations or access points 312-116 has an associated antenna or antenna array. For instance, base station or access point 312 wirelessly communicates with wireless communication devices 318 and 320 while base station or access point 316 wirelessly communicates with wireless communication devices 326-332. Typically, the wireless communication devices register with a particular base station or access point 312, 316 to receive services from the communication system 300.

Typically, base stations are used for cellular telephone systems (e.g., advanced mobile phone services (AMPS), digital AMPS, global system for mobile communications (GSM), code division multiple access (CDMA), local multi-point distribution systems (LMDS), multi-channel-multi-point distribution systems (MMDS), Enhanced Data rates for GSM Evolution (EDGE), General Packet Radio Service (GPRS), high-speed downlink packet access (HSDPA), high-speed uplink packet access (HSUPA and/or variations thereof) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio.

Figure 4:
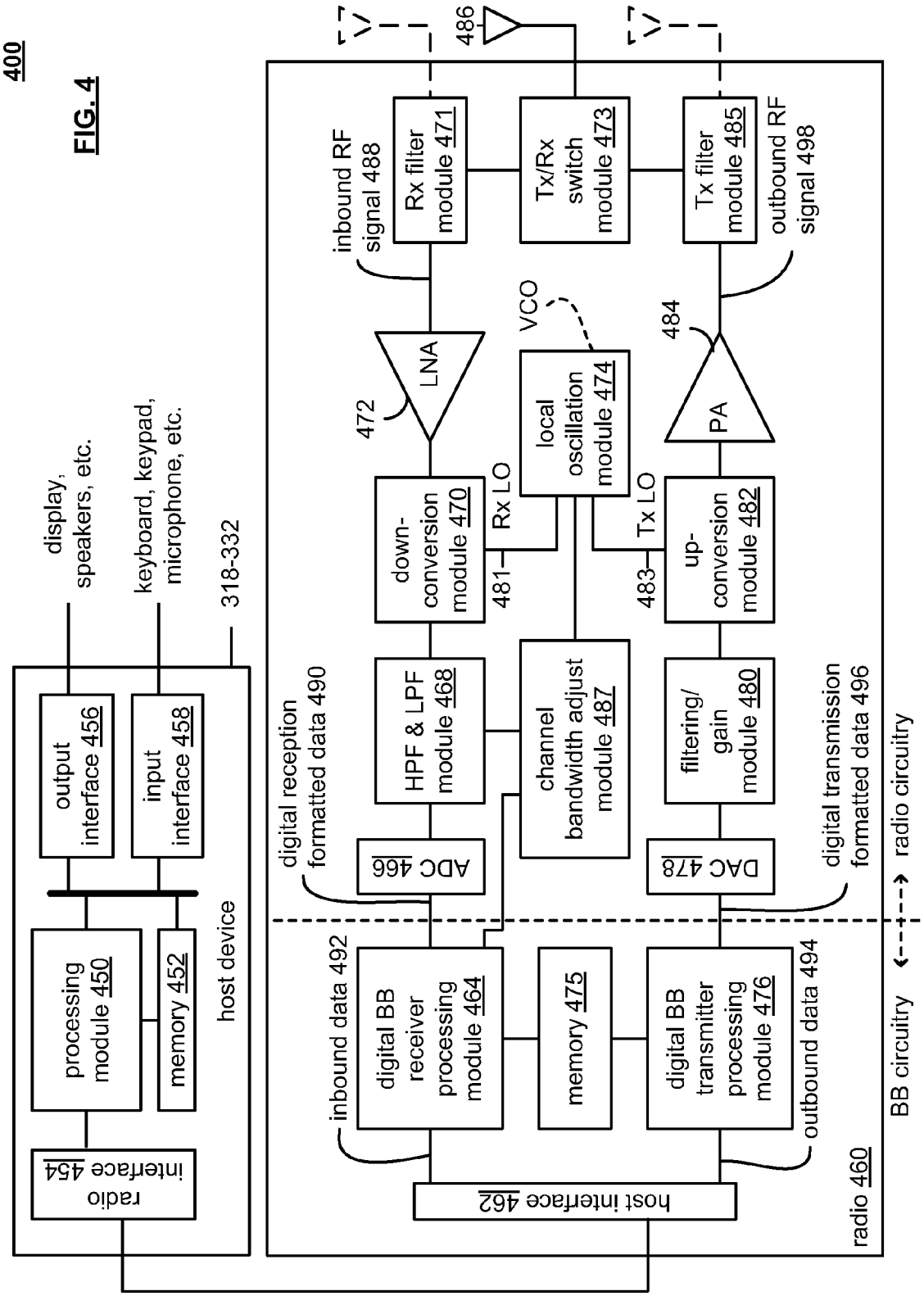
FIG. 4 is a diagram illustrating an embodiment of a wireless communication device.

FIG. 4 is a diagram illustrating an embodiment 300 of a wireless communication device that includes the host device 318-332 and an associated radio 460. For cellular telephone hosts, the radio 460 is a built-in component. For personal digital assistants hosts, laptop hosts, and/or personal computer hosts, the radio 460 may be built-in or an externally coupled component.

As illustrated, the host device 318-332 includes a processing module 450, memory 452, a radio interface 454, an input interface 458, and an output interface 456. The processing module 450 and memory 452 execute the corresponding instructions that are typically done by the host device. For example, for a cellular telephone host device, the processing module 450 performs the corresponding communication functions in accordance with a particular cellular telephone standard.

The radio interface 454 allows data to be received from and sent to the radio 460. For data received from the radio 460 (e.g., inbound data), the radio interface 454 provides the data to the processing module 450 for further processing and/or routing to the output interface 456. The output interface 456 provides connectivity to an output display device such as a display, monitor, speakers, etc., such that the received data may be displayed. The radio interface 454 also provides data from the processing module 450 to the radio 460. The processing module 450 may receive the outbound data from an input device such as a keyboard, keypad, microphone, etc., via the input interface 458 or generate the data itself. For data received via the input interface 458, the processing module 450 may perform a corresponding host function on the data and/or route it to the radio 460 via the radio interface 454.

Radio 460 includes a host interface 462, digital receiver processing module 464, an analog-to-digital converter 466, a high pass and low pass filter module 468, an IF mixing down conversion stage 470, a receiver filter 471, a low noise amplifier 472, a transmitter/receiver switch 473, a local oscillation module 474 (which may be implemented, at least in part, using a voltage controlled oscillator (VCO)), memory 475, a digital transmitter processing module 476, a digital-to-analog converter 478, a filtering/gain module 480, an IF mixing up conversion stage 482, a power amplifier 484, a transmitter filter module 485, a channel bandwidth adjust module 487, and an antenna 486. The antenna 486 may be a single antenna that is shared by the transmit and receive paths as regulated by the Tx/Rx switch 473, or may include separate antennas for the transmit path and receive path. The antenna implementation will depend on the particular standard to which the wireless communication device is compliant.

The digital receiver processing module 464 and the digital transmitter processing module 476, in combination with operational instructions stored in memory 475, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 464 and 476 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 475 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 464 and/or 476 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 460 receives outbound data 494 from the host device via the host interface 462. The host interface 462 routes the outbound data 494 to the digital transmitter processing module 476, which processes the outbound data 494 in accordance with a particular wireless communication standard (e.g., IEEE 802.11, Bluetooth, ZigBee, WiMAX (Worldwide Interoperability for Microwave Access), any other type of radio frequency based network protocol and/or variations thereof etc.) to produce outbound baseband signals 496. The outbound baseband signals 496 will be digital base-band signals (e.g., have a zero IF) or digital low IF signals, where the low IF typically will be in the frequency range of one hundred kHz (kilo-Hertz) to a few MHz (Mega-Hertz).

The digital-to-analog converter 478 converts the outbound baseband signals 496 from the digital domain to the analog domain. The filtering/gain module 480 filters and/or adjusts the gain of the analog signals prior to providing it to the IF mixing stage 482. The IF mixing stage 482 converts the analog baseband or low IF signals into RF signals based on a transmitter local oscillation 483 provided by local oscillation module 474. The power amplifier 484 amplifies the RF signals to produce outbound RF signals 498, which are filtered by the transmitter filter module 485. The antenna 486 transmits the outbound RF signals 498 to a targeted device such as a base station, an access point and/or another wireless communication device.

The radio 460 also receives inbound RF signals 488 via the antenna 486, which were transmitted by a base station, an access point, or another wireless communication device. The antenna 486 provides the inbound RF signals 488 to the receiver filter module 471 via the Tx/Rx switch 473, where the Rx filter 471 bandpass filters the inbound RF signals 488. The Rx filter 471 provides the filtered RF signals to low noise amplifier 472, which amplifies the signals 488 to produce an amplified inbound RF signals. The low noise amplifier 472 provides the amplified inbound RF signals to the IF mixing module 470, which directly converts the amplified inbound RF signals into an inbound low IF signals or baseband signals based on a receiver local oscillation 481 provided by local oscillation module 474. The down conversion module 470 provides the inbound low IF signals or baseband signals to the filtering/gain module 468. The high pass and low pass filter module 468 filters, based on settings provided by the channel bandwidth adjust module 487, the inbound low IF signals or the inbound baseband signals to produce filtered inbound signals.

The analog-to-digital converter 466 converts the filtered inbound signals from the analog domain to the digital domain to produce inbound baseband signals 490, where the inbound baseband signals 490 will be digital base-band signals or digital low IF signals, where the low IF typically will be in the frequency range of one hundred kHz to a few MHz. The digital receiver processing module 464, based on settings provided by the channel bandwidth adjust module 487, decodes, descrambles, demaps, and/or demodulates the inbound baseband signals 490 to recapture inbound data 492 in accordance with the particular wireless communication standard being implemented by radio 460. The host interface 462 provides the recaptured inbound data 492 to the host device 318-332 via the radio interface 454.

As one of average skill in the art will appreciate, the wireless communication device of the embodiment 400 of FIG. 4 may be implemented using one or more integrated circuits. For example, the host device may be implemented on one integrated circuit, the digital receiver processing module 464, the digital transmitter processing module 476 and memory 475 may be implemented on a second integrated circuit, and the remaining components of the radio 460, less the antenna 486, may be implemented on a third integrated circuit. As an alternate example, the radio 460 may be implemented on a single integrated circuit. As yet another example, the processing module 450 of the host device and the digital receiver and transmitter processing modules 464 and 476 may be a common processing device implemented on a single integrated circuit. Further, the memory 452 and memory 475 may be implemented on a single integrated circuit and/or on the same integrated circuit as the common processing modules of processing module 450 and the digital receiver and transmitter processing module 464 and 476.

Any of the various embodiments of communication device that may be implemented within various communication systems can incorporate functionality to perform communication via more than one standard, protocol, or other predetermined means of communication. For example, a single communication device, designed in accordance with certain aspects of the invention, can include functionality to perform communication in accordance with a first protocol, a second protocol, and/or a third protocol, and so on. These various protocols may be WiMAX (Worldwide Interoperability for Microwave Access) protocol, a protocol that complies with a wireless local area network (WLAN/WiFi) (e.g., one of the IEEE (Institute of Electrical and Electronics Engineer) 802.11 protocols such as 802.11a, 802.11b, 802.11g, 802.11n, 802.11ac, etc.), a Bluetooth protocol, or any other predetermined means by which wireless communication may be effectuated.

Figure 5:
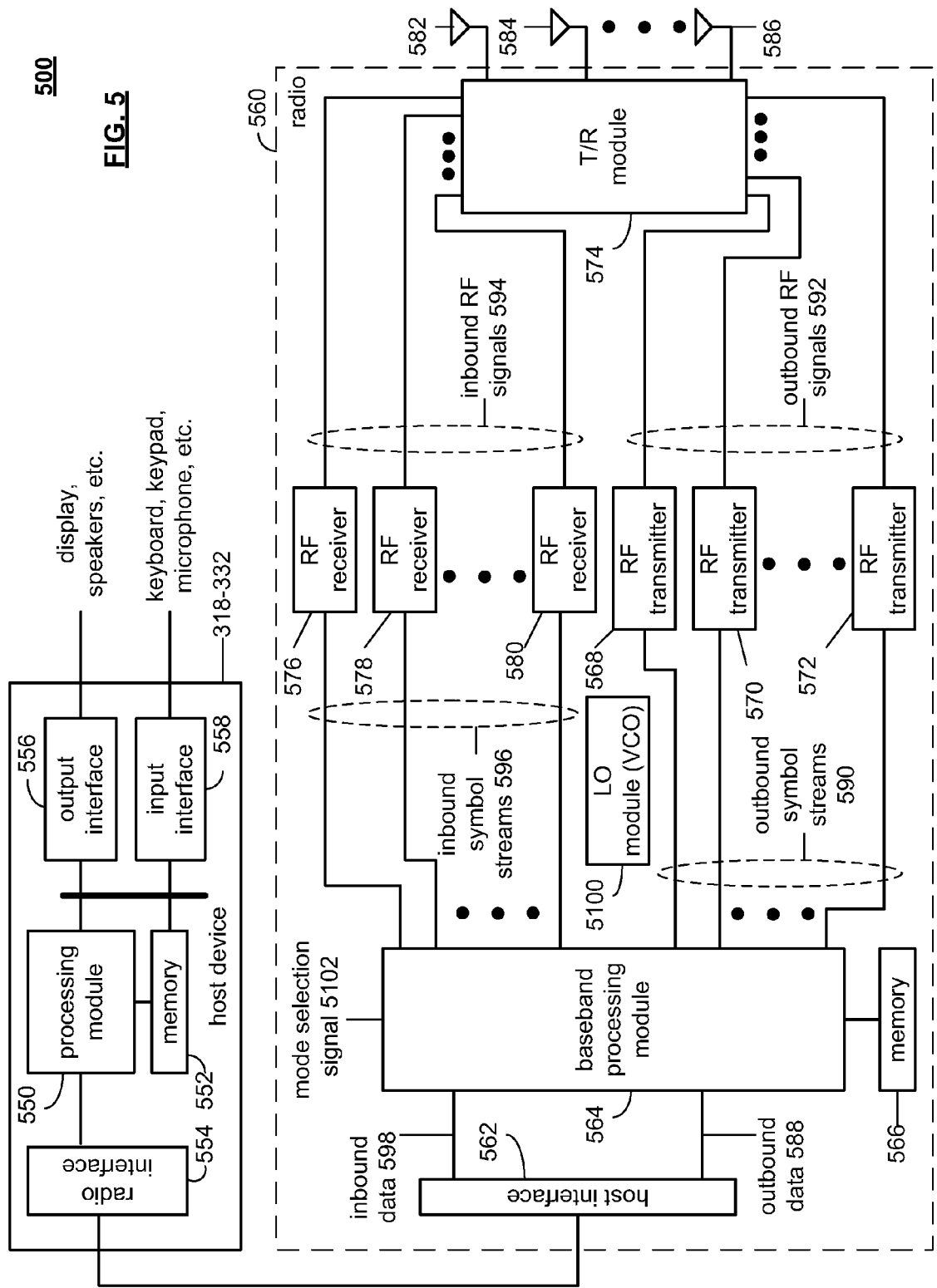
FIG. 5 is a diagram illustrating an alternative embodiment of a wireless communication device.

FIG. 5 is a diagram illustrating an alternative embodiment of a wireless communication device that includes the host device 318-332 and an associated at least one radio 560. For cellular telephone hosts, the radio 560 is a built-in component. For personal digital assistants hosts, laptop hosts, and/or personal computer hosts, the radio 560 may be built-in or an externally coupled component. For access points or base stations, the components are typically housed in a single structure.

As illustrated, the host device 318-332 includes a processing module 550, memory 552, radio interface 554, input interface 558 and output interface 556. The processing module 550 and memory 552 execute the corresponding instructions that are typically done by the host device. For example, for a cellular telephone host device, the processing module 550 performs the corresponding communication functions in accordance with a particular cellular telephone standard.

The radio interface 554 allows data to be received from and sent to the radio 560. For data received from the radio 560 (e.g., inbound data), the radio interface 554 provides the data to the processing module 550 for further processing and/or routing to the output interface 556. The output interface 556 provides connectivity to an output display device such as a display, monitor, speakers, et cetera such that the received data may be displayed. The radio interface 554 also provides data from the processing module 550 to the radio 560. The processing module 550 may receive the outbound data from an input device such as a keyboard, keypad, microphone, et cetera via the input interface 558 or generate the data itself. For data received via the input interface 558, the processing module 550 may perform a corresponding host function on the data and/or route it to the radio 560 via the radio interface 554.

Radio 560 includes a host interface 562, a baseband processing module 564, memory 566, a plurality of radio frequency (RF) transmitters 568-372, a transmit/receive (T/R) module 574, a plurality of antennae 582-386, a plurality of RF receivers 576-380, and a local oscillation module 5100 (which may be implemented, at least in part, using a VCO). The baseband processing module 564, in combination with operational instructions stored in memory 566, execute digital receiver functions and digital transmitter functions, respectively. The digital receiver functions, include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions, include, but are not limited to, scrambling, encoding, interleaving, constellation mapping, modulation, inverse fast Fourier transform, cyclic prefix addition, space and time encoding, and/or digital baseband to IF conversion. The baseband processing modules 564 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 566 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 564 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 560 receives outbound data 588 from the host device via the host interface 562. The baseband processing module 564 receives the outbound data 588 and, based on a mode selection signal 5102, produces one or more outbound symbol streams 590. The mode selection signal 5102 will indicate a particular mode as are illustrated in the mode selection tables, which appear at the end of the detailed discussion. Such operation as described herein is exemplary with respect to at least one possible embodiment, and it is of course noted that the various aspects and principles, and their equivalents, of the invention may be extended to other embodiments without departing from the scope and spirit of the invention.

For example, the mode selection signal 5102, with reference to table 1 may indicate a frequency band of 2.4 GHz or 5 GHz, a channel bandwidth of 20 or 22 MHz (e.g., channels of 20 or 22 MHz width) and a maximum bit rate of 54 megabits-per-second. In other embodiments, the channel bandwidth may extend up to 1.28 GHz or wider with supported maximum bit rates extending to 1 gigabit-per-second or greater. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. As is further illustrated in table 1, a code rate is supplied as well as number of coded bits per subcarrier (NBPSC), coded bits per OFDM symbol (NCBPS), and data bits per OFDM symbol (NDBPS).

The mode selection signal may also indicate a particular channelization for the corresponding mode which for the information in table 1 is illustrated in table 2. As shown, table 2 includes a channel number and corresponding center frequency. The mode select signal may further indicate a power spectral density mask value which for table 1 is illustrated in table 3. The mode select signal may alternatively indicate rates within table 4 that has a 5 GHz frequency band, 20 MHz channel bandwidth and a maximum bit rate of 54 megabits-per-second. If this is the particular mode select, the channelization is illustrated in table 5. As a further alternative, the mode select signal 5102 may indicate a 2.4 GHz frequency band, 20 MHz channels and a maximum bit rate of 192 megabits-per-second as illustrated in table 6. In table 6, a number of antennae may be utilized to achieve the higher bit rates. In this instance, the mode select would further indicate the number of antennae to be utilized. Table 7 illustrates the channelization for the set-up of table 6. Table 8 illustrates yet another mode option where the frequency band is 2.4 GHz, the channel bandwidth is 20 MHz and the maximum bit rate is 192 megabits-per-second. The corresponding table 8 includes various bit rates ranging from 12 megabits-per-second to 216 megabits-per-second utilizing 2-4 antennae and a spatial time encoding rate as indicated. Table 9 illustrates the channelization for table 8. The mode select signal 102 may further indicate a particular operating mode as illustrated in table 10, which corresponds to a 5 GHz frequency band having 40 MHz frequency band having 40 MHz channels and a maximum bit rate of 486 megabits-per-second. As shown in table 10, the bit rate may range from 13.5 megabits-per-second to 486 megabits-per-second utilizing 1-4 antennae and a corresponding spatial time code rate. Table 10 further illustrates a particular modulation scheme code rate and NBPSC values. Table 11 provides the power spectral density mask for table 10 and table 12 provides the channelization for table 10.

It is of course noted that other types of channels, having different bandwidths, may be employed in other embodiments without departing from the scope and spirit of the invention. For example, various other channels such as those having 80 MHz, 120 MHz, and/or 160 MHz of bandwidth may alternatively be employed such as in accordance with IEEE Task Group ac (TGac VHTL6).

The baseband processing module 564, based on the mode selection signal 5102 produces the one or more outbound symbol streams 590 from the output data 588. For example, if the mode selection signal 5102 indicates that a single transmit antenna is being utilized for the particular mode that has been selected, the baseband processing module 564 will produce a single outbound symbol stream 590. Alternatively, if the mode select signal indicates 2, 3 or 4 antennae, the baseband processing module 564 will produce 2, 3 or 4 outbound symbol streams 590 corresponding to the number of antennae from the output data 588.

Depending on the number of outbound streams 590 produced by the baseband module 564, a corresponding number of the RF transmitters 568-372 will be enabled to convert the outbound symbol streams 590 into outbound RF signals 592. The transmit/receive module 574 receives the outbound RF signals 592 and provides each outbound RF signal to a corresponding antenna 582-386.

When the radio 560 is in the receive mode, the transmit/receive module 574 receives one or more inbound RF signals via the antennae 582-386. The T/R module 574 provides the inbound RF signals 594 to one or more RF receivers 576-380. The RF receiver 576-380 converts the inbound RF signals 594 into a corresponding number of inbound symbol streams 596. The number of inbound symbol streams 596 will correspond to the particular mode in which the data was received (recall that the mode may be any one of the modes illustrated in tables 1-12). The baseband processing module 560 receives the inbound symbol streams 590 and converts them into inbound data 598, which is provided to the host device 318-332 via the host interface 562.

In one embodiment of radio 560 it includes a transmitter and a receiver. The transmitter may include a MAC module, a PLCP module, and a PMD module. The Medium Access Control (MAC) module, which may be implemented with the processing module 564, is operably coupled to convert a MAC Service Data Unit (MSDU) into a MAC Protocol Data Unit (MPDU) in accordance with a WLAN protocol. The Physical Layer Convergence Procedure (PLCP) Module, which may be implemented in the processing module 564, is operably coupled to convert the MPDU into a PLCP Protocol Data Unit (PPDU) in accordance with the WLAN protocol. The Physical Medium Dependent (PMD) module is operably coupled to convert the PPDU into a plurality of radio frequency (RF) signals in accordance with one of a plurality of operating modes of the WLAN protocol, wherein the plurality of operating modes includes multiple input and multiple output combinations.

An embodiment of the Physical Medium Dependent (PMD) module includes an error protection module, a demultiplexing module, and a plurality of direction conversion modules. The error protection module, which may be implemented in the processing module 564, is operably coupled to restructure a PPDU (PLCP (Physical Layer Convergence Procedure) Protocol Data Unit) to reduce transmission errors producing error protected data. The demultiplexing module is operably coupled to divide the error protected data into a plurality of error protected data streams The plurality of direct conversion modules is operably coupled to convert the plurality of error protected data streams into a plurality of radio frequency (RF) signals.

It is also noted that the wireless communication device of this diagram, as well as others described herein, may be implemented using one or more integrated circuits. For example, the host device may be implemented on one integrated circuit, the baseband processing module 564 and memory 566 may be implemented on a second integrated circuit, and the remaining components of the radio 560, less the antennae 582-586, may be implemented on a third integrated circuit. As an alternate example, the radio 560 may be implemented on a single integrated circuit. As yet another example, the processing module 550 of the host device and the baseband processing module 564 may be a common processing device implemented on a single integrated circuit. Further, the memory 552 and memory 566 may be implemented on a single integrated circuit and/or on the same integrated circuit as the common processing modules of processing module 550 and the baseband processing module 564.

The previous diagrams and their associated written description illustrate some possible embodiments by which a wireless communication device may be constructed and implemented. In some embodiments, more than one radio (e.g., such as multiple instantiations of the radio 460, the radio 560, a combination thereof, or even another implementation of a radio) is implemented within a wireless communication device. For example, a single wireless communication device can include multiple radios therein to effectuate simultaneous transmission of two or more signals. Also, multiple radios within a wireless communication device can effectuate simultaneous reception of two or more signals, or transmission of one or more signals at the same time as reception of one or more other signals (e.g., simultaneous transmission/reception).

Within the various diagrams and embodiments described and depicted herein, wireless communication devices may generally be referred to as WDEVs, DEVs, TXs, and/or RXs. It is noted that such wireless communication devices may be wireless stations (STAs), access points (APs), or any other type of wireless communication device without departing from the scope and spirit of the invention. Generally speaking, wireless communication devices that are APs may be referred to as transmitting or transmitter wireless communication devices, and wireless communication devices that are STAs may be referred to as receiving or receiver wireless communication devices in certain contexts.

Of course, it is noted that the general nomenclature employed herein wherein a transmitting wireless communication device (e.g., such as being an AP, or a STA operating as an 'AP' with respect to other STAs) initiates communications, and/or operates as a network controller type of wireless communication device, with respect to a number of other, receiving wireless communication devices (e.g., such as being STAs), and the receiving wireless communication devices (e.g., such as being STAs) responding to and cooperating with the transmitting wireless communication device in supporting such communications.

Of course, while this general nomenclature of transmitting wireless communication device(s) and receiving wireless communication device(s) may be employed to differentiate the operations as performed by such different wireless communication devices within a communication system, all such wireless communication devices within such a communication system may of course support bi-directional communications to and from other wireless communication devices within the communication system. In other words, the various types of transmitting wireless communication device(s) and receiving wireless communication device(s) may all support bi-directional communications to and from other wireless communication devices within the communication system.

Various aspects and principles, and their equivalents, of the invention as presented herein may be adapted for use in various standards, protocols, and/or recommended practices (including those currently under development) such as those in accordance with IEEE 802.11x (e.g., where x is a, b, g, n, ac, ah, ad, af, etc.).

A novel system and architecture is presented herein by which various components of a display may undergo selective encoding in accordance with one or more different respective encodings. That is to say, different respective media and/or multimedia elements as may be provided to a display for consumption by a user may undergo selectively different encoding. For example, a given display may at times displayed entirely different media elements (e.g., photo/image, picture-in-picture (PIP), graphics, text, gadgets, a taskbar, background, video, audio, user interactive feature, and/or generally any type of overlay x). Different respective media elements may undergo different respective encoding in accordance with different respective streams before being provided to a display for consumption by a user. In some instances, multiple media elements are provided to a common display. In other instances, different respective media elements are respectively provided to more than one display.

For example, after receiving such different respective media elements, that may be received either separately, or in accordance with some fully or partially combined form [such as in parallel with one another, in the serial stream, etc.], an encoder is operative to provide multistream encoded output. In some embodiments, both media elements and non-media elements may undergo encoding such that a multistream encoded output may be composed of both media and non-media components (e.g., which may be transmitted independently with respect to each other). For example, any embodiment described herein may be adapted to include and be related not only media elements but instead to include a combination of media and non-media elements.

Such an encoder may be implemented in any of a variety of ways including as a single encoder, as multiple encoders operating either independently or cooperatively/in concert with one another, etc. each respective multistream encoded output is operative to be delivered over at least a portion of a communication channel. In some instances, such a communication channel is implemented using one or more wireless communication channels (e.g., alternatively referred to as wireless communication links, etc.). If desired, each respective multistream encoded output may be particularly tailored or encoded to characteristics associated with a particular one of the wireless communication channels along which it may be transmitted. Such particular and selective encoding may be adapted both to the particular type and characteristics of a given media element in addition to a wireless communication channel along which it may be transmitted. Generally speaking, such adaptive and/or dynamically selected types of encoding may be based upon a given media element type, communication channel characteristics associated with the given media element, other media elements and/or other non-media/unrelated information as may be communicated within the communication system, and/or sink characteristics, and/or other considerations as well.

In addition, certain embodiments operate on communications effectuated via groups of multimedia streams such that each respective stream may be specifically tailored for and serve a different purpose. For example, a given communication may be composed of two or more entirely different types of media elements (e.g., picture-in-picture and a primary media program). While a given communication may include two or more entirely different types of media elements, a typical encoding approach is to treat the entire communication in a common manner. Herein, an improved encoding and/or transcoding approach allows for independent and selective processing of different respective portions of a given communication (e.g., processing each of the picture-in-picture and the primary media program independently/selectively in accordance with different respective encodings). In an embodiment in which a first media element may be overlaid a second media element within an image and/or video signal for display, it is noted that certain consideration should be directed towards any regional orientation of those respective media elements in regards to overlay, re-synchronization (e.g., video refresh rates), channel allocation, and balancing her stream and/or per group to ensure appropriate video and audio synchronization between the respective media elements. For example, certain media elements will perhaps have a lower quality of service (QoS) than others. Coordination and consideration is then taken to ensure that different respective media elements having different respective characteristics and/or properties are appropriately handled for adequately acceptable output (e.g., such as via a display for use or consumption).

Particularly in the context of wireless communications, such a wireless communication protocol may be constructed in accordance with in accordance with various aspects, and their equivalents, of the invention such that each respective stream including its respective media elements may be treated independently and differently with respect to the other streams including their respective media elements. Again, any of a variety of different media elements may be handled differently (e.g., each of media elements including photo/image, picture-in-picture (PIP), graphics, text, gadgets, a taskbar, background, video, audio, user interactive feature, and/or generally any type of overlay x, etc. may be handled differently). Any of a variety of software type applications may be employed in supporting such different media elements.

Such a wireless communication protocol may also operate based upon the inherently time varying characteristics of a wireless communication channel. For example, a wireless communication channel may very over time in terms of a variety of operational parameters and/or characteristics (e.g., available bandwidth, signal-to-noise ratio, noise, interference, etc. may all vary as a function of time).

Present, historical, and/or anticipated characteristics of a wireless communication channel may be employed in accordance with adaptively and selectively encoding different respective media elements streams within an overall signaling set. Also, prioritization among multiple media streams may be employed in accordance with such adaptive and selective encoding. That is to say, a current or primary media element stream may be given primacy over secondary ranked or prioritized media element streams. The secondary (and subsequent such as third, fourth, etc.) media element streams are afforded available remaining bandwidth (e.g., after ensuring that the current or primary media element stream is provisioned sufficient bandwidth) and may, in some instances, be downgraded (e.g., if relatively little bandwidth is available) in terms of signal quality (e.g., a relatively lowered the rate, resolution, etc.). Also, these selective encoding approaches, visual quality, and lost/erroneous packet resilience can be adapted on a stream by stream basis with group by group waiting based on a number of parameters including group value, latency requirements, screen and/or display area commitments, etc.

As the reader will understand, such a wireless communication protocol is operative to treat different respective video sub-elements and frame overlays independently. For example, in one embodiment, video may be composed of multiple sub-elements that are each to be provided via a user interface (e.g., a display such as a television, computer monitor, etc.) for consumption by a user. As such, a given video signal may itself be composed of more than one frame sequence. Various respective media elements (e.g., sub-elements) within such a video signal may involve multiple respective views (e.g., some being two-dimensional, others being three-dimensional, etc.). For example, a first overlay type within a video signal may have a first perspective view, while a second overlay type within that same video signal may have a second perspective view. With respect to the various sub-elements within a given video signal, each one may be separately encoded, delivered, decoded, and combined downstream for output via a user interface for consumption by a user. That is to say, in one embodiment, respective frames, slices, layers/overlays, etc. of a given video signal may be handled independently and separately. Moreover, the encoding (e.g., which may include some form of encryption/decryption), transmission, and decoding (e.g., which may also include some form of encryption/decryption) of each respective layer may be handled independently and separately. Some alternative embodiments by which such respective layers may be handled dependently and separately include handling them (1) entirely independently via separate delivery channels (e.g., via separate wireless communication channels), (2) independently via a sub-reservation protocol, (3) on a frame by frame basis, and (4) in accordance with separate or combined queuing, etc.

A variety of media devices may include circuitry and/or functionality to effectuate various aspects, and their equivalents, of the invention. Generally speaking, any digital media processing device may include any such aspects of the invention. Respective and independent encoding and/or transcoding of different media elements may be performed within any of the various devices depicted below in FIG. 6A-6H. Many of these various devices include some form of display by which one or more media streams may be output or provided for consumption by a user. For example, many such devices include some form of output device to allow a user to consume such media elements (e.g., a display for the viewing of image and/or video media, and audio output device [such as at least one speaker] for listening to audio media, etc.). These various devices do not include an exhaustive list of devices in which one or more of the various aspects of the invention may be implemented. Generally speaking, any of a variety of media processing capable devices may include circuitry and/or functionality operative to perform independent processing of respective media elements and their independent and/or combined transmission via one or more wireless communication channels. Any such generic media processing device may be implemented to perform the processing described herein without departing from the scope and spirit of the invention.

Figure 6:
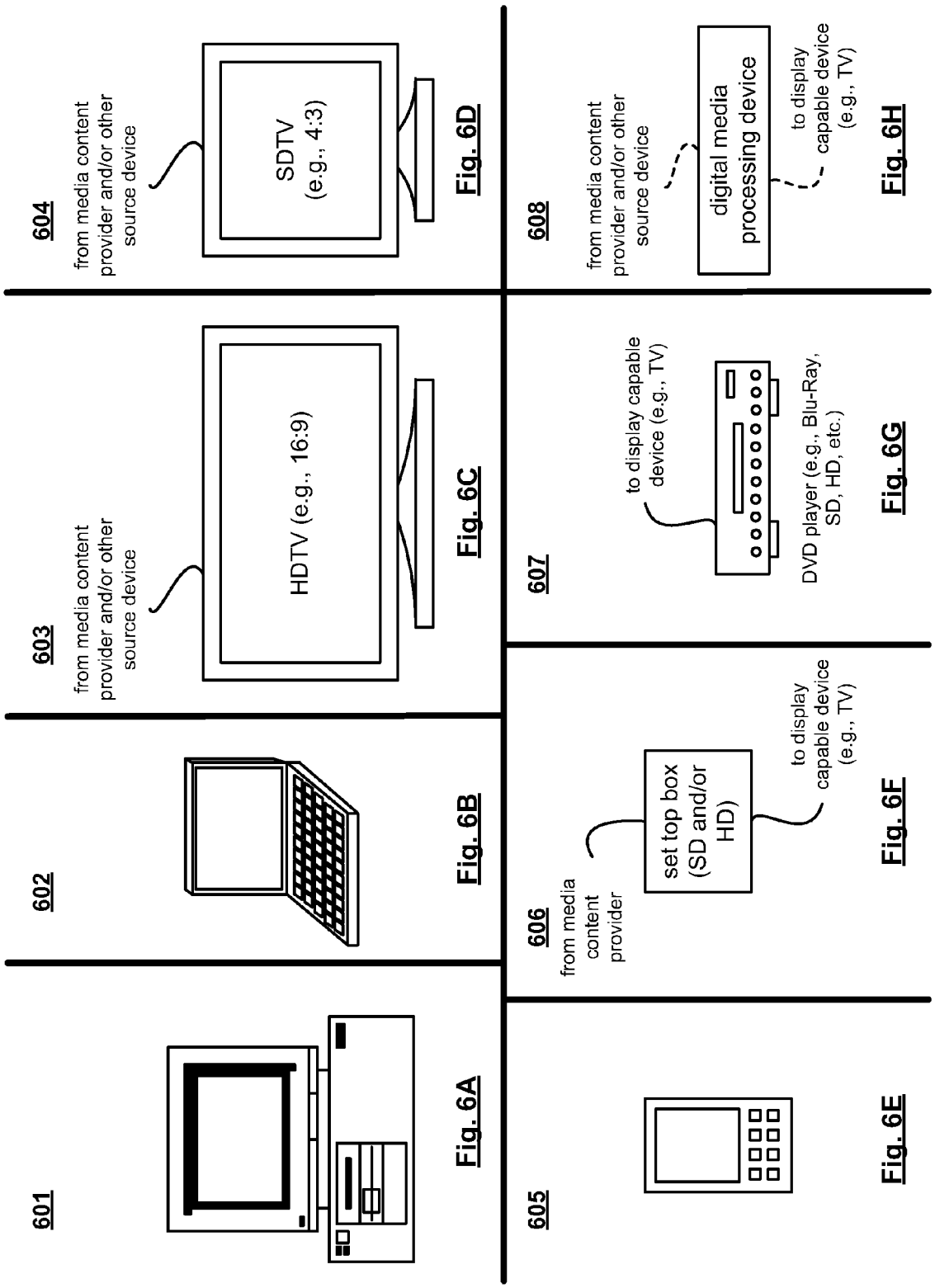
FIG. 6A is a diagram illustrating an embodiment of a computer.
FIG. 6B is a diagram illustrating an embodiment of a laptop computer.
FIG. 6C is a diagram illustrating an embodiment of a high definition (HD) television.
FIG. 6D is a diagram illustrating an embodiment of a standard definition (SD) television.
FIG. 6E is a diagram illustrating an embodiment of a handheld media unit.
FIG. 6F is a diagram illustrating an embodiment of a set top box (STB).
FIG. 6G is a diagram illustrating an embodiment of a digital video disc (DVD) player.
FIG. 6H is a diagram illustrating an embodiment of a generic digital image processing device.

FIG. 6A is a diagram illustrating an embodiment of a computer 601. The computer 601 can be a desktop computer, or an enterprise storage devices such a server, of a host computer that is attached to a storage array such as a redundant array of independent disks (RAID) array, storage router, edge router, storage switch and/or storage director. A user is able to view still digital images or video (e.g., a sequence of digital images) using the computer 601. Oftentimes, various image viewing programs and/or media player programs are included on a computer 601 to allow a user to view such images (including video). With respect to the presentation of such media elements for consumption by a user, the computer 601 may include circuitry and/or functionality to effectuate various aspects of the invention including an encoder/transmitter side processing as well as decoder/receiver side processing.

FIG. 6B is a diagram illustrating an embodiment of a laptop computer 602. Such a laptop computer 602 may be found and used in any of a wide variety of contexts. In recent years, with the ever-increasing processing capability and functionality found within laptop computers, they are being employed in many instances where previously higher-end and more capable desktop computers would be used. As with the computer 601, the laptop computer 602 may include various image viewing programs and/or media player programs to allow a user to view such images (including video). With respect to the presentation of such media elements for consumption by a user, the laptop computer 602 may include circuitry and/or functionality to effectuate various aspects of the invention including an encoder/transmitter side processing as well as decoder/receiver side processing.

FIG. 6C is a diagram illustrating an embodiment of a high definition (HD) television 603. Many HD televisions 603 include an integrated tuner to allow the receipt, processing, and decoding of media content (e.g., television broadcast signals) thereon. Alternatively, sometimes an HD television 603 receives media content from another source such as a digital video disc (DVD) player, set top box (STB) that receives, processes, and decodes a cable and/or satellite television broadcast signal. Regardless of the particular implementation, the HD television 603 may be implemented to perform image processing as described herein. Generally speaking, an HD television 603 has capability to display HD media content and oftentimes is implemented having a 16:9 widescreen aspect ratio. Generally speaking, such a HD television 603 may be viewed as a display/output device for presentation of media elements for consumption by a user. While most embodiments of such a HD television 602 will be directed towards decoder/receiver side processing, certain embodiments may also include bidirectional communication capability such that encoder/transmitter side processing capabilities are also included therein.

FIG. 6D is a diagram illustrating an embodiment of a standard definition (SD) television 604. Of course, an SD television 604 is somewhat analogous to an HD television 603, with at least one difference being that the SD television 604 does not include capability to display HD media content, and an SD television 604 oftentimes is implemented having a 4:3 full screen aspect ratio. Nonetheless, even an SD television 604 may be implemented to perform image processing as described herein. Generally speaking, such a SD television 604 may be viewed as a display/output device for presentation of media elements for consumption by a user. While most embodiments of such a SD television 604 will be directed towards decoder/receiver side processing, certain embodiments may also include bidirectional communication capability such that encoder/transmitter side processing capabilities are also included therein.

FIG. 6E is a diagram illustrating an embodiment of a handheld media unit 605. A handheld media unit 605 may operate to provide general storage or storage of image/video content information such as joint photographic experts group (JPEG) files, tagged image file format (TIFF), bitmap, motion picture experts group (MPEG) files, Windows Media (WMA/WMV) files, other types of video content such as MPEG4 files, etc. for playback to a user, and/or any other type of information that may be stored in a digital format. Historically, such handheld media units were primarily employed for storage and playback of audio media; however, such a handheld media unit 605 may be employed for storage and playback of virtual any media (e.g., audio media, video media, photographic media, etc.). Moreover, such a handheld media unit 605 may also include other functionality such as integrated communication circuitry for wired and wireless communications. Such a handheld media unit 605 may be implemented to perform image processing as described herein. Generally speaking, such a handheld media unit 605 may be viewed as a display/output device for presentation of media elements for consumption by a user. While most embodiments of such a handheld media unit 605 will be directed towards decoder/receiver side processing, certain embodiments may also include bidirectional communication capability such that encoder/transmitter side processing capabilities are also included therein.

FIG. 6F is a diagram illustrating an embodiment of a set top box (STB) 606. As mentioned above, sometimes a STB 606 may be implemented to receive, process, and decode a cable and/or satellite television broadcast signal to be provided to any appropriate display capable device such as SD television 604 and/or HD television 603. Such an STB 606 may operate independently or cooperatively with such a display capable device to perform image processing as described herein. In a preferred embodiment, such an STB 606 includes encoder and/or transcoder circuitry and/or functionality such that different respective media elements may undergo independent and respective transcoding and/or encoding therein to effectuate wireless delivery thereof to one or more display/output devices. As such, such an STB 606 may include circuitry and/or functionality to effectuate various aspects of the invention including an encoder/transmitter side processing as well as decoder/receiver side processing.

FIG. 6G is a diagram illustrating an embodiment of a digital video disc (DVD) player 607. Such a DVD player may be a Blu-Ray DVD player, an HD capable DVD player, an SD capable DVD player, an up-sampling capable DVD player (e.g., from SD to HD, etc.) without departing from the scope and spirit of the invention. The DVD player may provide a signal to any appropriate display capable device such as SD television 604 and/or HD television 603. The DVD player 605 may be implemented to perform image processing as described herein. Generally speaking, such a DVD player 607 may be viewed as a device that is operative to generate one or more media elements to be provided to a separate and distinct display/output device for presentation of media elements for consumption by a user. As the reader will understand, such a DVD player 607 typically operates based upon locally available media (e.g., one or more DVDs that are read by the DVD player 607). While most embodiments of such a DVD player 607 will be directed towards encoder/transmitter side processing, certain embodiments may also include bidirectional communication capability such that decoder/receiver side processing capabilities are also included therein.

FIG. 6H is a diagram illustrating an embodiment of a generic digital media processing device 608. Again, as mentioned above, these various devices described above do not include an exhaustive list of devices in which the media processing described herein may be effectuated, and it is noted that any generic media image processing device 608 may be implemented to perform any one or more operations in accordance with in accordance with various aspects, and their equivalents, of the invention.

Figure 7:
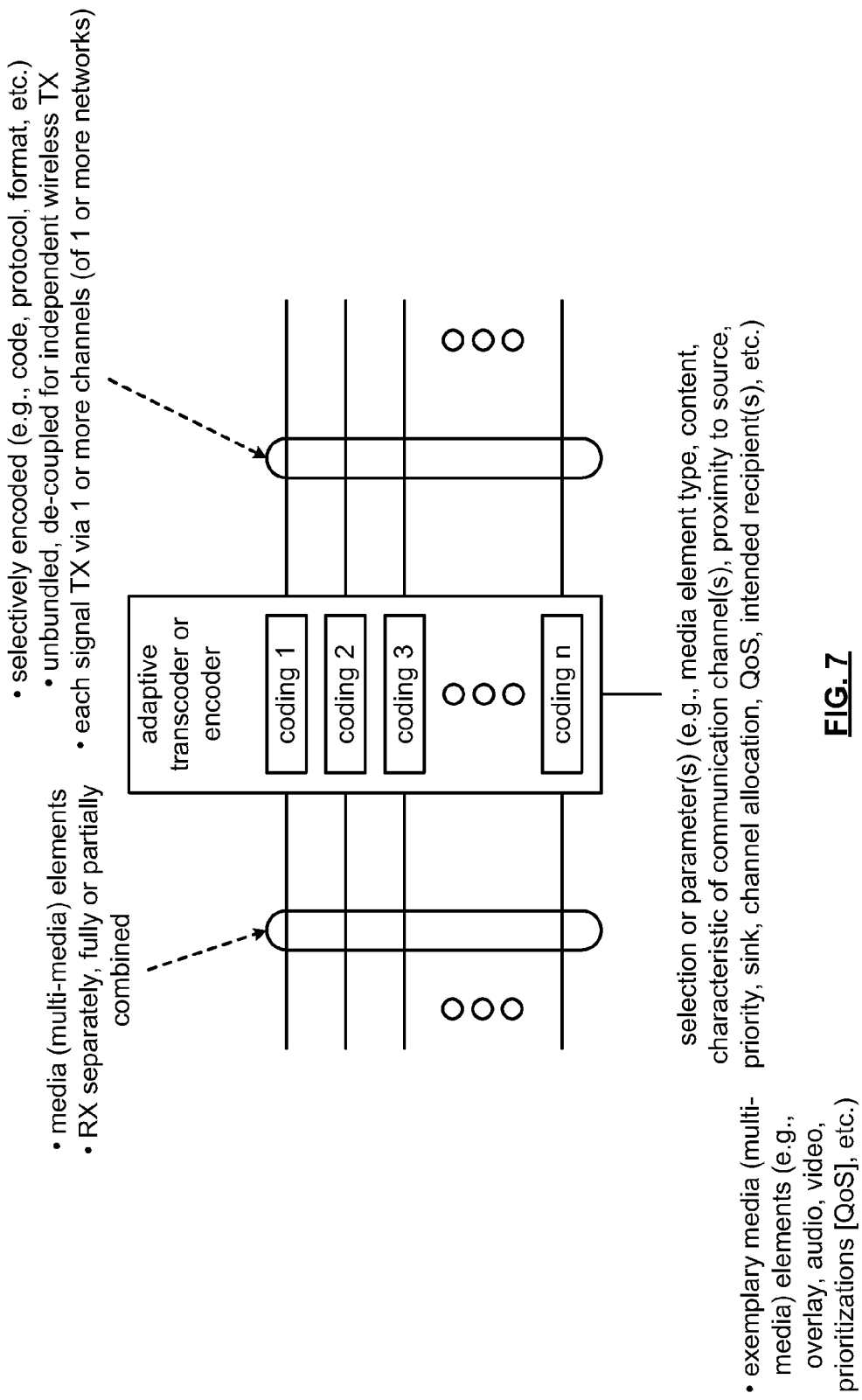
FIG. 7, FIG. 8, and FIG. 9 are diagram illustrating various embodiments of adaptive transcoding or encoding of various media and/or multi-media elements in accordance with one or more codes selected from among a plurality of codes.
Figure 8:
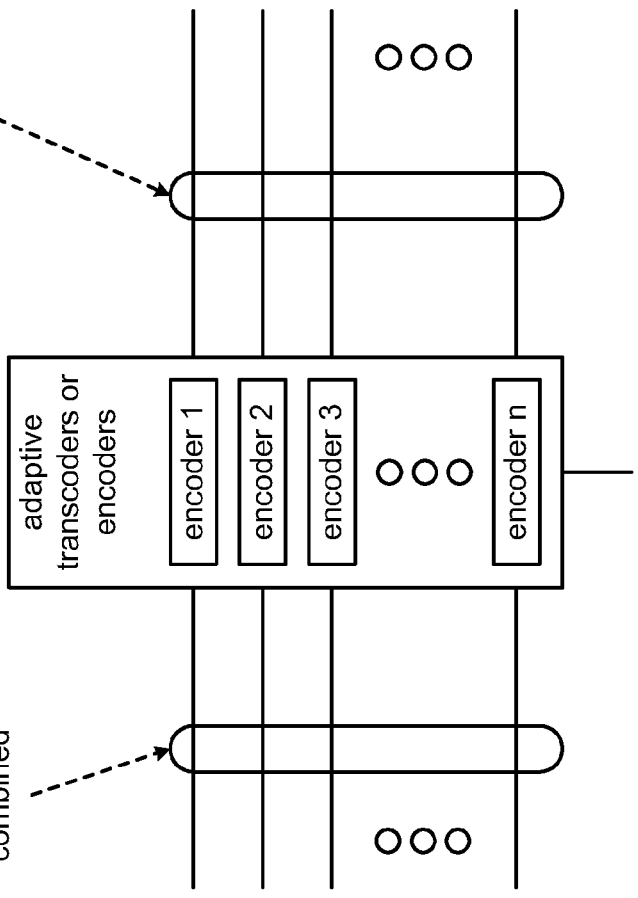
Figure 9:
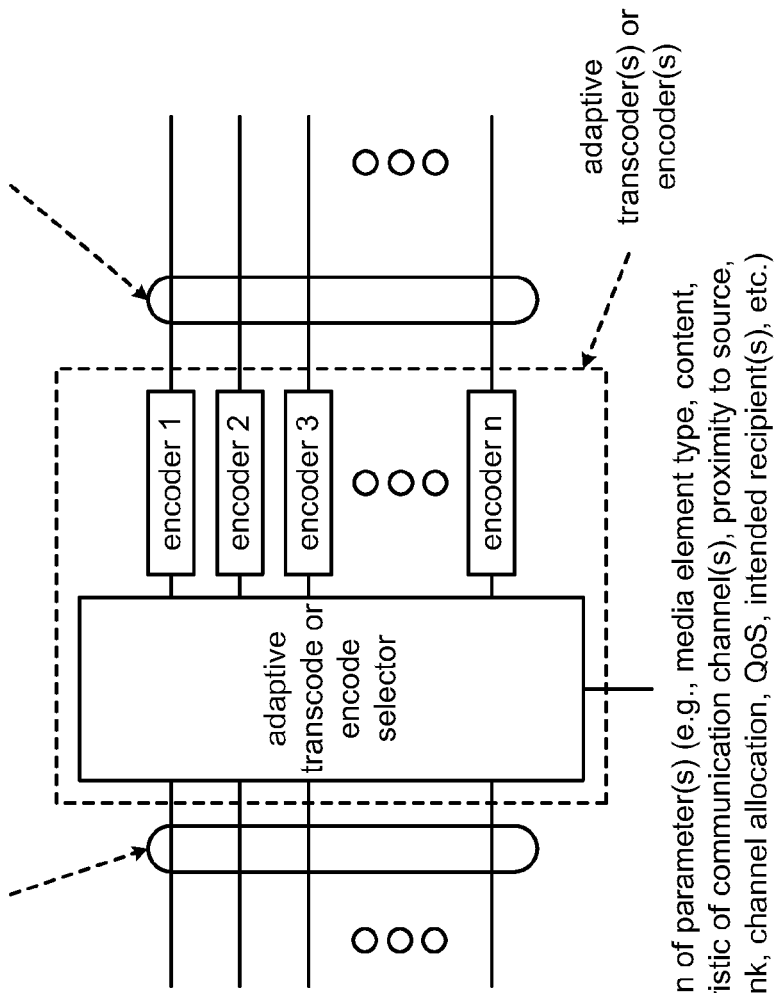

FIG. 7, FIG. 8, and FIG. 9 are diagram illustrating various embodiments 700, 800, and 900, respectively, of adaptive transcoding and/or encoding of various media and/or multi-media elements in accordance with one or more codes selected from among a plurality of codes.

Referring to the embodiment 700 of FIG. 7, multiple respective media elements (e.g., multi-media elements) are received by an adaptive transcoder and/or encoder. These respective media elements may be received separately or combined in some manner (e.g., partially combined such that only certain of the media elements are included in one or more groups, fully combined, etc.). Also, it is noted that the respective media elements need not necessarily be received synchronously. That is to say, a first respective media element may be received at or during a first time, a second respective media element may be received at or during a second time, etc.

The adaptive transcoder and/or encoder is operative to employ any one of a number of respective codings to the respective media elements received thereby. That is to say, the adaptive transcoder and/or encoder is operative selectively to encode each respective media element. For example, any of a number of tools may be employed for selectively encoding a given media element (e.g., code, protocol, format, etc.). The adaptive transcoder and/or encoder may select any combination of such respective tools for encoding a given media element. The transcoded and/or encoded media elements may be output from the adaptive transcoder and/or encoder in and unbundled or decoupled format for independent wireless transmission to one or more other devices.

It is noted that each respective transcoded and/or encoded media element may be transmitted via a respective one or more channels to one or more other devices. For example, a first of the transcoded and/or encoded media element may be transmitted via a first one or more channels, a second of the transcoded and/or encoded media element may be transmitted via a second one or more channels, etc. If desired, a common transcoded and/or encoded media element may be respectively transmitted via two or more channels for delivery to two or more respective devices (e.g., such as in the case in which two different displays are to output the same transcoded and/or encoded media element).

Also, in some instances, adaptation may be made with respect to one or more of the channels employed for transmission. For example, in accordance with a prioritization scheme in which at least one of the transcoded and/or encoded media elements has a relatively higher priority and delivery thereof is of relatively higher priority, in the event of degradation of a communication channel over which that transcoded and/or encoded media element being transmitted, an alternative communication channel may be employed or the current communication channel may be augmented by being combined with one or more other communication channels. Generally speaking, adaptation of encoding (including any one of various parameters associated therewith) and/or channels employed for transmission may be made. In some instances, such adaptation is based upon feedback from a recipient device to which at least one of the transcoded and/or encoded media elements as being transmitted or is to be transmitted.

Any of a number of encoding selection parameters may drive the selective combination of one or more respective tools as may be employed for encoding a given media element. For example, some encoding selection parameters may include media element type, the content of the media element, one or more characteristics of a wireless communication channel by which the transcoded and/or encoded media elements may be transmitted, the proximity of the adaptive transcoder and/or encoder or a device including the adaptive transcoder and/or encoder to one or more other devices to which the transcoded and/or encoded media elements may be transmitted, the relative or absolute priority of one or more of the transcoded and/or encoded media elements, sink characteristics channel allocation of one or more wireless communication channels, quality of service, characteristics associated with one or more intended recipients to which the transcoded and/or encoded media elements may be transmitted, etc.).

As can be seen with respect to this diagram, a single adaptive transcoder and/or encoder includes selectivity by which different respective media elements may be transcoded and/ or encoded for generating different respective transcoded and/or encoded media elements that may be independently transmitted to one or more output devices for consumption by one or more users.

With respect to this diagram an embodiment as well as with respect to other diagrams and embodiments herein, it is noted that one or more of the encoding selection parameters may be based, at least in part, upon information provided by a device to which at least one of the encoded signals is transmitted or provided to. For example, a receiving device may provide feedback to a transmitting device, such that the transmitting device may appropriately make selection of one or more encoding parameters. Considering a receiver, which may include a decoder, such a receiver may be more appropriately placed to be aware of certain communication channel characteristics (e.g., channel rate, changes thereof, jitter, distortion, interference, signal-to-noise ratio, etc.). Also, a receiver may provide information to a transmitter such that the transmitter may effectuate adaptation to any one or more of the respective signals provided there from. For example, by using information provided from receiver, a transmitter may appropriately change frame rate, resolution, and/or any other operational parameter, etc. in accordance with adaptive streaming of respective media elements that may be provided downstream.

In some embodiments, the respective media elements correspond to a display operative to support those media elements in accordance with at least one configuration. For example, the different media elements may correspond to different overlay types that may be employed and displayed via a display (e.g., such as a computer monitor, television, a handheld device with a display, etc.). In such an embodiment, after having undergone appropriate encoding and/or transcoding, the modified media elements undergo transmission to at least one recipient device. For example, such a recipient device may also be a display that is different than the original display from which the media elements are provided. It is noted that such an adaptive transcoder or encoder may be included within such an originating/source display in some embodiments. In other embodiments, such an adaptive transcoder or encoder may be remotely located with respect to such an originating/source display, such as being implemented as an intervening or middling node within a communication network located remotely with respect to an originating/source display and also located remotely with respect to a terminating/recipient display (e.g., a display implemented for outputting such media elements for use or consumption); for example, a first display, an intervening or middling node, and a second display may all be in communication with one another via one or more communicatively coupled networks (e.g., such as any one or more of local area networks (LANs), wireless local area networks (WLANs), wide area networks (WANs), the Internet, an intranet, a proprietary network, and/or any combination of different network types including those implemented using any of a number of different types of communication media such as, but not limited to, those depicted with reference to FIG. 1). Of course, and even other embodiments, such an adaptive transcoder or encoder may be included within such a terminating/recipient display.

Referring to the embodiment 800 of FIG. 8, this diagram depicts an embodiment having a different architecture that is operable to effectuate selectivity by which different respective media elements may be transcoded and/or encoded for generating different respective transcoded and/or encoded media elements that may be independently transmitted to one or more output devices for consumption by one or more users.

This diagram depicts a plurality of encoders operating cooperatively or in a coordinated manner such that different respective media elements may be selectively provided to one or more of the encoders. As the reader will understand, at least one difference depicted within this embodiment when compared to the previous embodiment includes separate and distinctly implemented encoders that are cooperatively operative to effectuate the selective transcoding and/or encoding of media elements as compared to a single adaptive transcoder and/or encoder that is operative to perform transcoding and/or encoding based upon one or more codings. In accordance with one implementation of the architecture of this particular diagram, each respective encoder among the adaptive transcoders and/or encoders may correspond to a respective coding.

Referring to the embodiment 900 of FIG. 9, this diagram depicts yet another embodiment that is operable to effectuate selectivity by which different respective media elements may be transcoded and/or encoded for generating different respective transcoded and/or encoded media elements that may be independently transmitted to one or more output devices for consumption by one or more users.

As can be seen with respect to this embodiment, an adaptive transcode selector is operative to provide respective media elements to one or more encoders. In accordance with one implementation of the architecture of this particular diagram, each respective encoder among the adaptive transcoders and/or encoders may correspond to a respective coding. The adaptive transcode selector is the circuitry, module, etc. that is operative to perform the selective providing of the respective media elements to one or more encoders.

Figure 10:
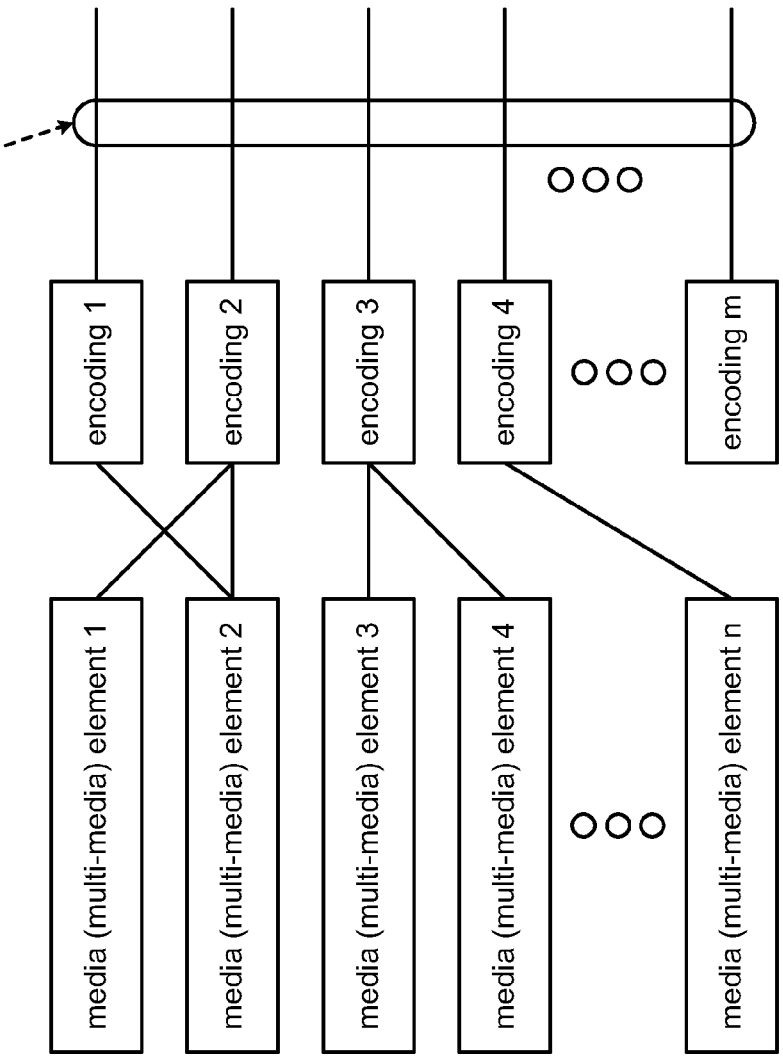
FIG. 10 is a diagram illustrating an embodiment of adaptive transcoding of various media and/or multi-media elements in which one or more elements may undergo similar encoding and/or any given element may undergo encoding using two or more encodings.

FIG. 10 is a diagram illustrating an embodiment 1000 of adaptive transcoding and/or encoding of various media and/or multi-media elements in which one or more elements may undergo similar encoding and/or any given element may undergo encoding using two or more encodings. This diagram illustrates how any one media element may undergo encoding in accordance with one or more respective encodings. For example, a given media elements may undergo different respective encoding to generate different respective transcoded and/or encoded media elements for respective transmission to different respective recipient devices.

From another perspective, this diagram illustrates how any one or more media elements may undergo encoding in accordance with a similar, common, or same encoding using a singular encoding. For example more than one media element may undergo encoding in accordance with such a singular encoding for generating an transcoded and/or encoded media element for respective transmission to a given recipient device.

Any combination and selectivity between media elements and encodings and/or transcodings may be performed without departing from the scope and spirit of the invention.

Figure 11:
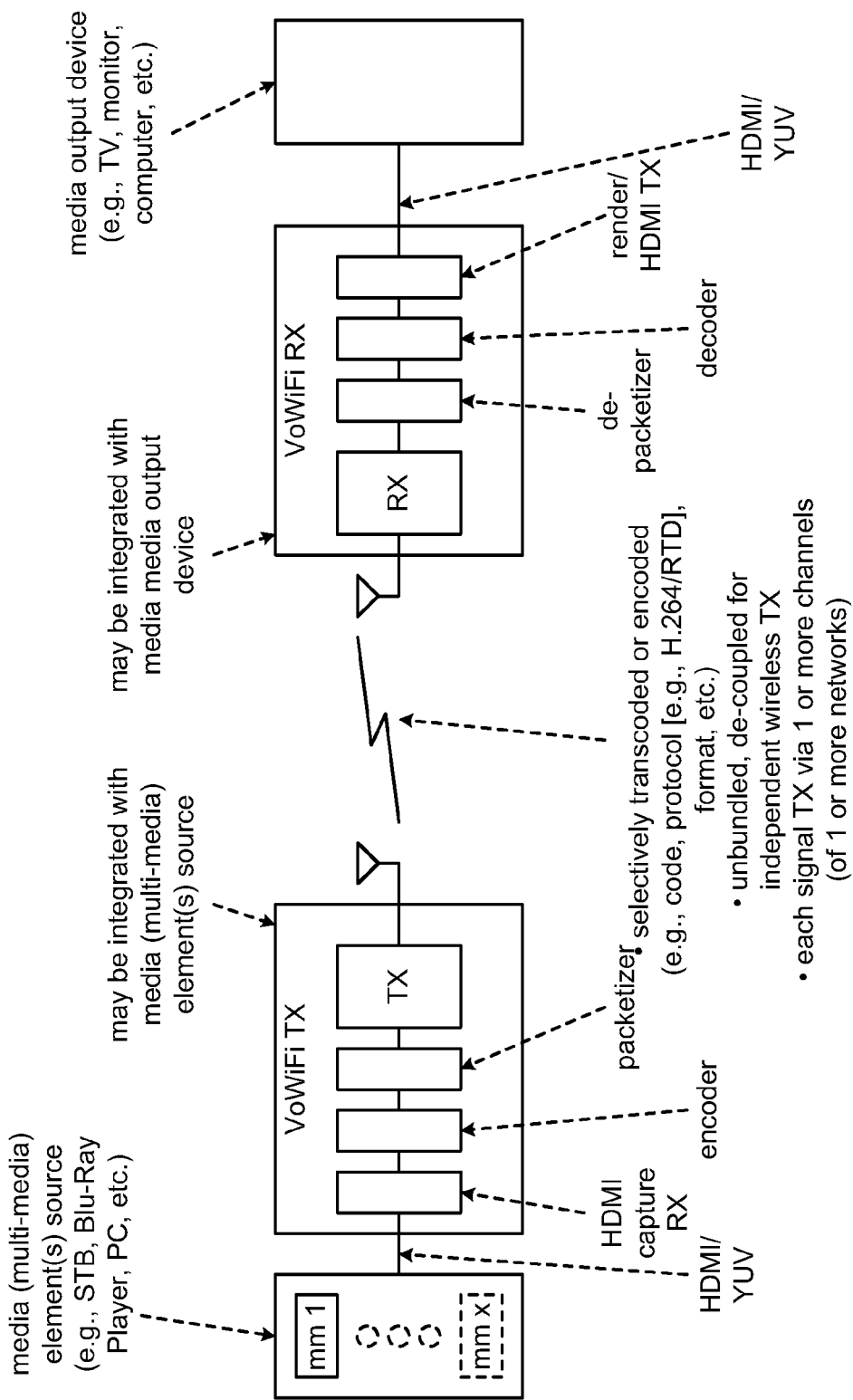
FIG. 11 is a diagram illustrating an alternative embodiment of a wireless communication system.

FIG. 11 is a diagram illustrating an alternative embodiment 1100 of a wireless communication system. The wireless communication system of this diagram illustrates how different respective media elements may be provided from one or more media element sources (e.g., examples of such media element sources include STBs, Blu-Ray players, PCs, etc.). A video over wireless local area network/Wi-Fi transmitter (VoWiFi TX) is operative to receive one or more media elements from one or more media element sources. These one or more media elements may be provided in accordance with any of a variety of communication standards, protocols, and/or recommended practices. In one embodiment, one or more media elements are provided in accordance with High Definition Multi-media Interface™ (HDMI) and/or YUV (such as HDMI/YUV). As the reader will understand, the YUV model defines a color space in terms of one luma (Y) [e.g., brightness] and two chrominance (UV) [e.g., color] components.

The VoWiFi TX includes respective circuitries and/or functional blocks therein. For example, an HDMI capture receiver initially receives the one or more media elements and performs appropriate receive processing thereof. An encoder then is operative selectively to encode different respective media elements in accordance with the in accordance with various aspects, and their equivalents, of the invention. A packetizer is implemented to packetize the respective transcoded and/or encoded media elements for subsequent transmission to one or more recipient devices using the transmitter (TX) within the VoWiFi TX.

Independent and unbundled transcoded and/or encoded media elements may be transmitted to one or more recipient devices via one or more wireless communication channels. Within this diagram, one such recipient device is depicted therein, namely, a video over wireless local area network/Wi-Fi receiver (VoWiFi RX). Generally speaking, the VoWiFi RX is operative to perform the complementary processing that has been performed within the VoWiFi TX. That is to say, the VoWiFi RX includes respective circuitries and/or functional blocks that are complementary to the respective circuitries and/or functional blocks within the VoWiFi TX. For example, a receiver (RX) therein is operative to perform appropriate receive processing of one or more media elements received thereby. A de-packetizer is operative to construct a signal sequence from a number of packets. Thereafter, a decoder is operative to perform the complementary processing to that which was performed by the encoder within the VoWiFi TX. The output from the decoder is provided to a render/HDMI transmitter (TX) to generate at least one transcoded and/or encoded media element that may be output via one or more devices for consumption by one or more users.

Figure 12:
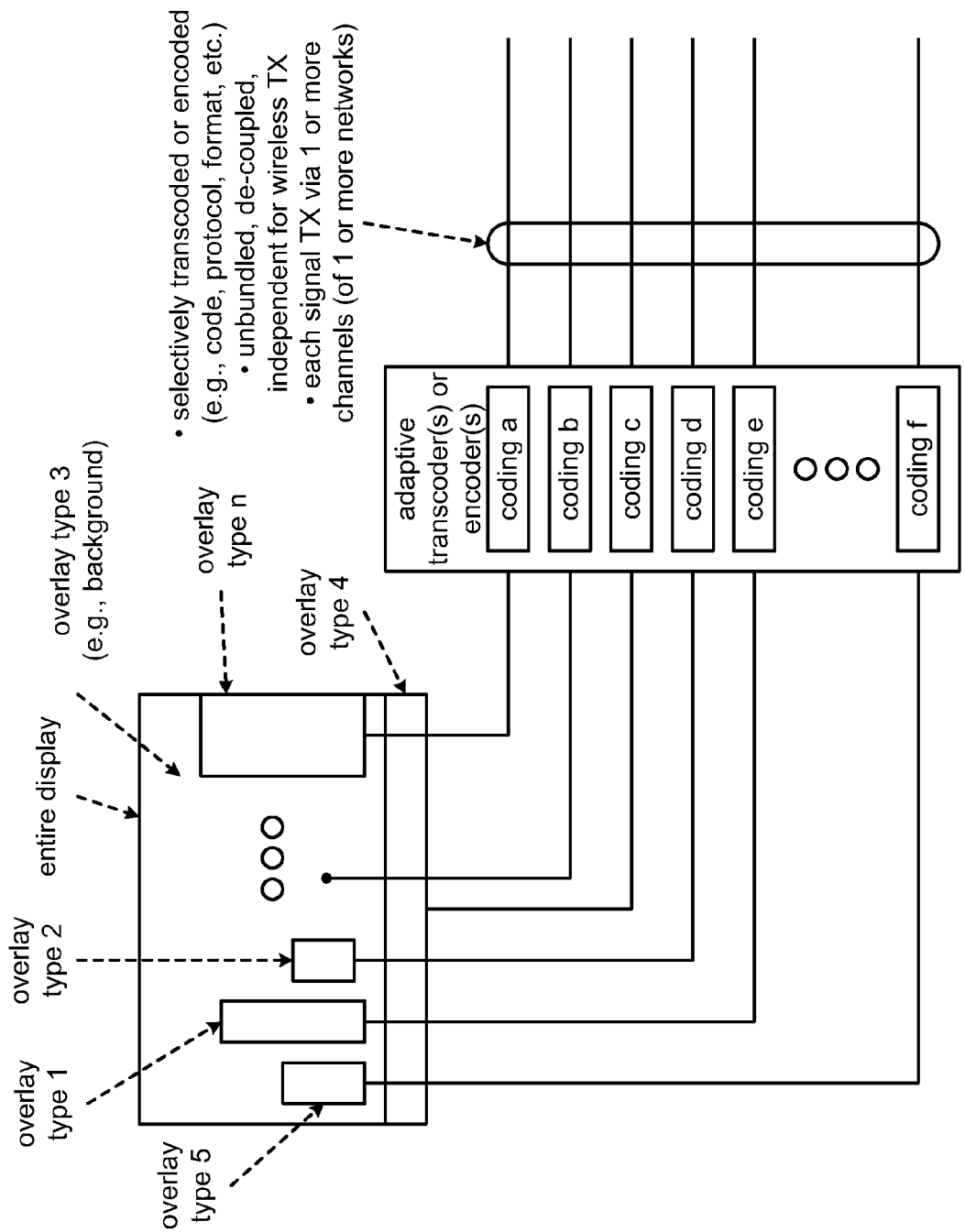
FIG. 12 is a diagram illustrating an embodiment in which various overlays of a display undergo selective and adaptive encoding.

FIG. 12 is a diagram illustrating an embodiment 1200 in which various overlays of a display undergo selective and adaptive encoding. As depicted within this diagram, multiple overlay types may be included within a given configuration of a display. For example, in one given configuration, a display may include a background on which multiple overlays are placed thereon. Of course, it is noted that a given display may be operative to support display of a number of different media elements corresponding to a number of respective overlay types in any of a number of different configurations. Also, it is noted that two or more of the media elements may have a common or same overlay type.

Generally speaking, any of a number of different media elements of any of a number of different overlay types may be included within a given configuration of a display, and each respective media element and corresponding overlay type may have separate and independent characteristics associated therewith. At any given time, the respective media elements and overlays may be of different sizes, occupy different percentages of the display, have different properties, etc.

Each respective overlay (e.g., the background of the display may be viewed as one of the overlays) may undergo respective transcoding and/or encoding using any of the various adaptive transcoder and/or encoder embodiments, variants, or their equivalents in accordance with the teaching and disclosure herein. Independent and unbundled transcoded and/or encoded media elements may then be transmitted to one or more recipient devices via one or more wireless communication channels. As can be seen, different respective media elements, such as may be associated with a given configuration of a display, are selectively and independently handled.

In certain embodiments, at least some of respective overlays which may undergo respective independent coding correspond to graphical user interface (GUI)-based applications. Some of these overlays may also be related to multimedia type applications. Generally speaking, the different respective overlays as described within the such diagrams and embodiments herein correspond to on screen displays, windows, GUI, dialog boxes, etc. and other respective interfaces that may correspond to any of a number of different applications. It is noted that different overlays may correspond respectively to different applications. For one possible example, a first overlay may correspond to a first multimedia application, a second overlay may correspond to an e-mail program, a third overlay may correspond to a document viewer, a fourth overlay may correspond to a status bar/widget depicting region of the display, etc. Again, many of the overlays may be viewed as being related to graphical overlays on a screen. Also, as described elsewhere herein, different overlays may have different properties (e.g., in terms of their respective dynamic nature, some changing quite frequently, some changing little if at all)

Figure 13:
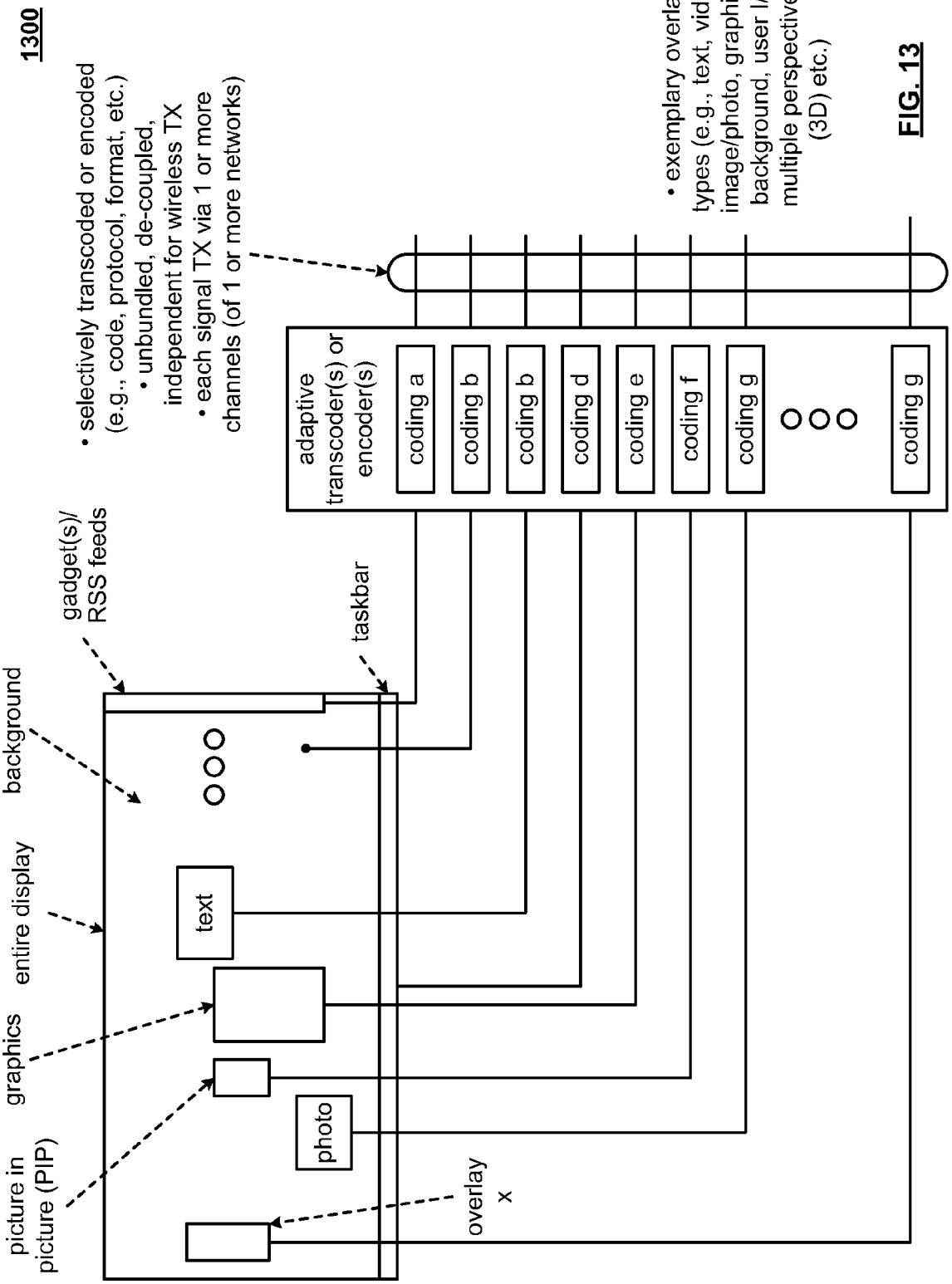
FIG. 13 is a diagram illustrating an embodiment in which exemplary overlays and various content types of a display undergo selective and adaptive encoding.

FIG. 13 is a diagram illustrating an embodiment 1300 in which exemplary overlays and various content types of a display undergo selective and adaptive encoding. This diagram has some similarities when compared to the previous diagram. Certain exemplary overlay types are described with reference to this diagram. Within a given configuration of a display, any one or more of a variety of media elements may be included at any given time. Some examples of such media elements include, but are not limited to, photo/image, picture-in-picture (PIP), graphics, text, gadgets, a taskbar, background, video, audio, user interactive feature, and/or generally any type of overlay x. As the reader will understand, certain types of overlays are very dynamic in nature (e.g., such as video that may be displayed via some media player, PIP, etc.). Other types of overlays are relatively static in nature (e.g., background, photo/image, taskbar, etc.). Certain other types of overlays may stand across this spectrum from dynamic to static (e.g., certain gadgets such as a clock are largely static, yet may in fact change as the hands of a clock move, etc.). That is to say, a spectrum of dynamic to static characteristics may be associated with the different overlay types.

As such, different respective overlays may undergo respective transcoding and/or encoding using any of the various adaptive transcoder and/or encoder embodiments, variants, or their equivalents in accordance with the teaching and disclosure herein. Independent and unbundled transcoded and/or encoded media elements may then be transmitted to one or more recipient devices via one or more wireless communication channels. As can be seen, different respective media elements, such as may be associated with a given configuration of a display, are selectively and independently handled. Because of the inherently different characteristics and/or properties of the various overlay types, they need the selectively and independently handled. For example, a first coding having relatively poor capability for representing highly dynamic media elements yet having relatively good capability for representing predominantly static media elements may be sufficient for and may be employed for representing media elements such as the background, photo/image, taskbar, etc. However, a second coding having relatively good capability for representing highly dynamic media elements may be employed representing media elements such as video, PIP, etc.

As such, different respective codings may have different respective properties and capabilities such that any one given coding may be appropriately associated and used for one particular media element type or a group of particular media element types. As may be understood, such adaptive transcoding and/or encoding operations allows for appropriate and respective handling of different media elements of any of a variety of media element types. As such, the overall processing capability and resources of a given device may be most efficiently used. For example, a relatively small amount of processing capability and resource may be provision for transcoding and/or encoding those media elements that may be provided in accordance with a relatively low complexity coding while still providing an acceptable perceptual quality for consumption by a user. This appropriate provisioning of the finite processing capability and resources of a given device will allow for a maximum possible provisioning of such processing capability and resource for those media elements that will benefit from a relatively higher complexity coding to provide as high as possible perceptual quality for consumption by a user. From certain perspectives, the characterization of different media element types allows for not only the selection of one or more codings to be employed therefore, but the characterization of the different media element types also allows for efficient allocation of the finite and limited processing capability and resources of a device.

In certain embodiments, such processing capability and resource allocation may be adaptive based upon any of a number of operational considerations (e.g., historical, present, anticipated/expected processing requirements, etc.). In other embodiments, such processing capability and resource allocation may be based upon user selected configuration(s) or setting(s).

Figure 14:
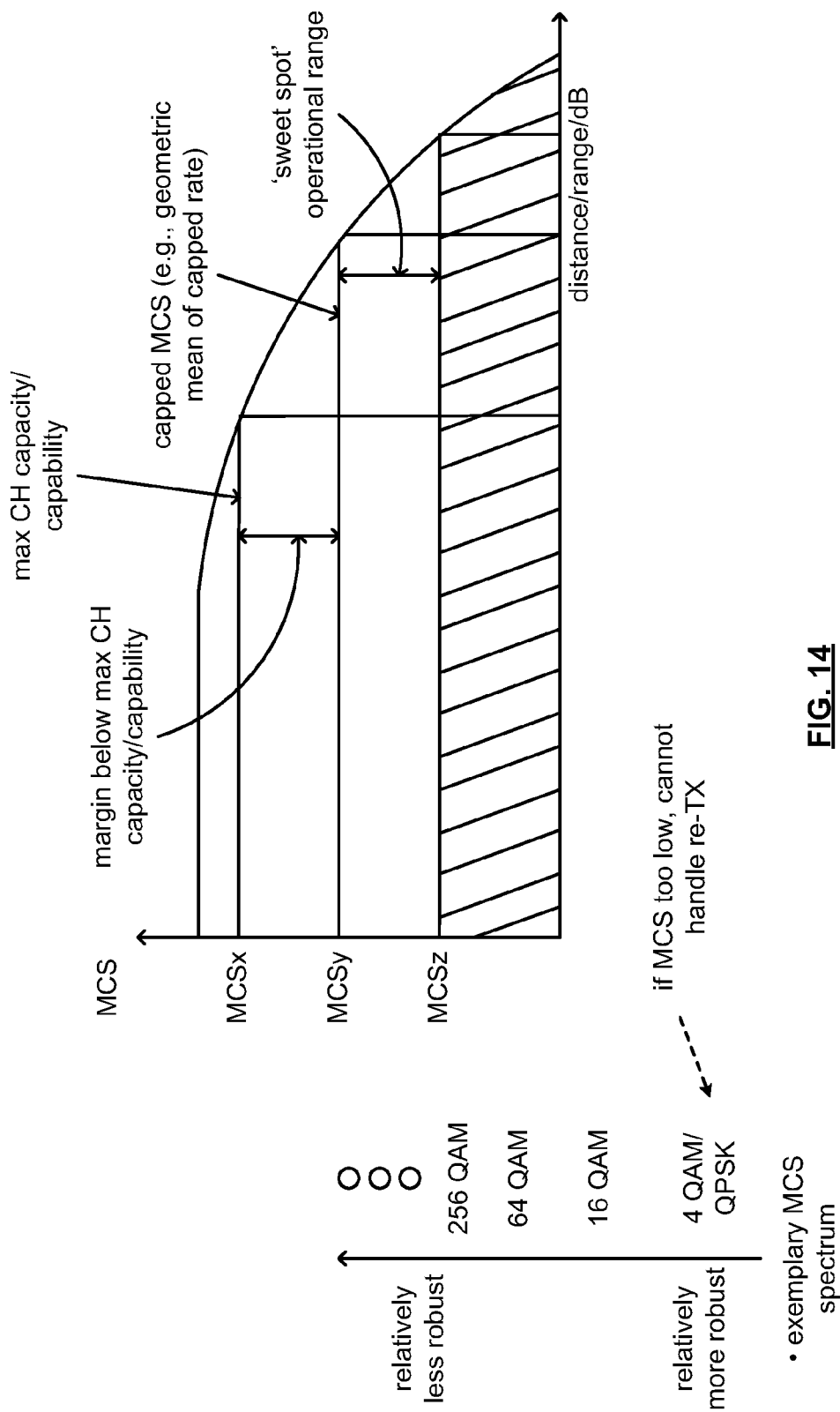
FIG. 14 is a diagram illustrating an embodiment of selectively capping a peak communication rate and/or modulation coding set (MCS) in accordance with ensuring wireless delivery of various overlays.

FIG. 14 is a diagram illustrating an embodiment 1400 of selectively capping a peak communication rate and/or modulation coding set (MCS) in accordance with ensuring wireless delivery of various overlays. This diagram depicts an implementation by which a 'sweet spot' operational range is selected that is below the maximum channel capacity or capability by some particular margin. This margin may be predetermined/fixed or a default margin. However, in alternative embodiments, the margin may be adapted and adjusted as a function of one or more considerations.

Generally speaking, a given wireless communication channel is operative to support a given capacity of throughput (e.g., a particular bandwidth capable of supporting a particular number of bits or symbols per second, with a particular signal-to-noise ratio, etc.). A modulation coding set (MCS) is selected that is below the maximal MCS that may be supported by the wireless communication channel (e.g., below by some particular margin) to ensure that one or more transcoded and/or encoded media elements may be transmitted via the communication channel and be delivered to one or more recipient devices with an acceptable quality level.

For example, there may be significant variability with respect to the capacity and/or capabilities of a given wireless communication channel. In order to ensure that one or more transcoded and/or encoded media elements may be transmitted via the communication channel and be delivered to one or more recipient devices with an acceptable quality level, a rate selective methodology is operative to provide some margin of operation by tapping the peak rate or MCS that is employed in accordance with the transmission of one or more transcoded and/or encoded media elements. Generally speaking, by employing such capping functionality, one or more transcoded and/or encoded media elements may be transmitted in a relatively more robust or higher resilient manner. For example, the MCS may be capped at a given level that is sufficient to support a bit rate capable of wirelessly delivering video with an acceptable perceptual quality. The selection of the maximum allowable MCS may be based upon a geometric mean of a capped rate.

In accordance with operation based upon such capping functionality, rate adaptation may be performed to assist in the delivery of one or more transcoded and/or encoded media elements in a relatively more robust manner. That is to say, a 'sweet spot' operational range that is selected in accordance with the various considerations and/or constraints presented herein, adaptation across a spectrum of MCSs may be made. Such adaptation may be based upon variability of one or more parameters or characteristics associated one or more wireless communication channels via which one or more transcoded and/or encoded media elements may be transmitted. It is noted that a given baseline MCS may be inadequate for supporting effective delivery of video (e.g., QPSK which may not be able to handle retransmissions). As such, the 'sweet spot' operational range may be appropriately selected to be, at a minimum, above such a baseline MCS. Generally speaking, the 'sweet spot' operational range should be selected to provide for delivery of a desired group of types of media elements each at an acceptable quality level.

FIG. 15A, FIG. 15B, FIG. 16A, FIG. 16B, FIG. 17A, and FIG. 17B illustrate various embodiment of methods as may be performed in accordance with operation of various devices such as various wireless communication devices operative to perform encoding and/or transcoding of media signals including respective media elements therein.

Figure 15B:
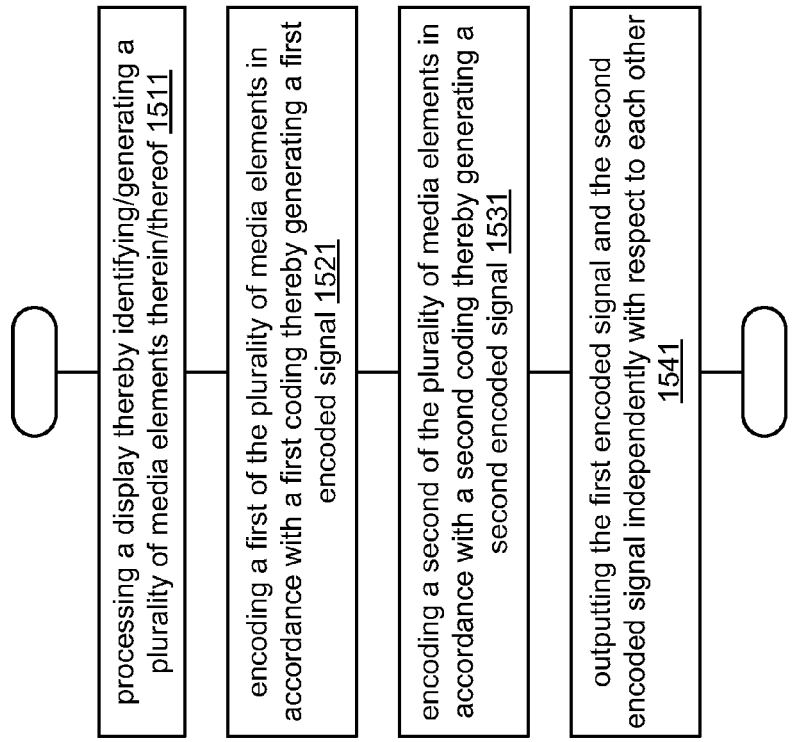
Figure 15A:
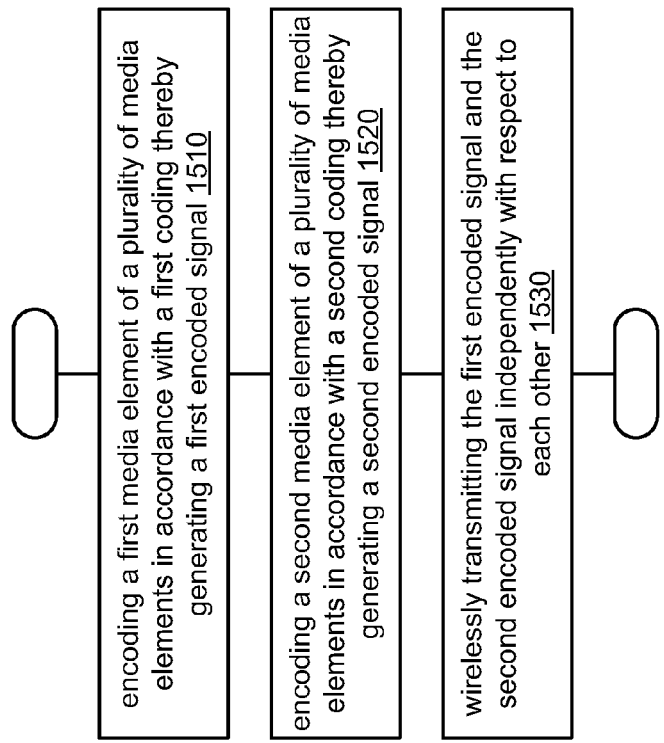

Referring to method 1500 of FIG. 15A, the method 1500 begins by encoding a first media element in accordance with a first coding thereby generating a first encoded signal, as shown in a block 1510. For example, the first media element may be one of a number or group of media elements.

The method 1500 continues by encoding a second media element in accordance with a second coding thereby generating a second encoded signal, as shown in a block 1520. In certain embodiments, the second media element may be another one of the media elements within the same group in which the first media element is included.

The method 1500 then operates by wirelessly transmitting the first encoded signal and the second encoded signal independently with respect to each other, as shown in a block 1530. That is to say, the first encoded signal and the second encoded signal are treated independently, in an unbundled manner, etc. In certain embodiments, the first encoded signal is transmitted via a first wireless communication link, and the second encoded signal is transmitted via a second wireless communication link. In other embodiments, both the first encoded signal and the second encoded signal are transmitted via a common wireless communication link. Nonetheless, both the first encoded signal and the second encoded signal may be transmitted at different times, sequentially or successively, etc. such that they are transmitted independently with respect to each other.

Referring to method 1501 of FIG. 15B, the method 1501 begins by processing the display thereby identifying/generating a number of media elements therein/thereof, as shown in a block 1511. For example, a given configuration of a display (e.g., at a particular time) may be composed of different media elements therein. From an alternative perspective, a display (e.g., at a particular time) may be viewed as being composed of different media elements.

The method 1501 then operates by encoding a first of those media elements in accordance with a first coding thereby generating a first encoded signal, as shown in a block 1521. The method 1501 continues by encoding a second of those media elements in accordance with a second coding thereby generating a second encoded signal, as shown in a block 1531.

The method 1501 then operates by outputting the first encoded signal and the second encoded signal independently with respect to each other, as shown in a block 1541. Certain embodiments relate to outputting the first encoded signal and the second encoded signal via one or more wireless communication links. Other embodiments relate to outputting the first encoded signal and the second encoded signal via one or more wired communication links.

Referring to method 1600 of FIG. 16A, the method 1600 begins by encoding a first media element in accordance with a coding thereby generating a first encoded signal, as shown in a block 1610.

The method 1600 continues by encoding a second media element in accordance with the coding (e.g., the same coding as described with reference to the block 1610) thereby generating a second encoded signal, as shown in a block 1620. As can be seen, both the first encoded signal and the second encoded signal are generated using the same coding. However, as may also be seen, the first encoded signal and the second encoded signal are generated from different respective media elements.

The method 1600 then operates by outputting the first encoded signal and the second encoded signal independently with respect to each other, as shown in a block 1630. As described with respect other embodiments herein, certain embodiments relate to outputting the first encoded signal and the second encoded signal via one or more wireless communication links. Other embodiments relate to outputting the first encoded signal and the second encoded signal via one or more wired communication links.

Referring to method 1601 of FIG. 16B, the method 1601 begins by encoding a particular media element in accordance with a first coding thereby generating a first encoded signal, as shown in a block 1611. The method 1601 then operates by encoding the media element (e.g., the same media elements as described with reference to the block 1611) in accordance with a second coding thereby generating a second encoded signal, as shown in a block 1621. In certain embodiments, the first coding and the second coding are part of the same group of codings.

The method 1601 continues by outputting the first encoded signal and the second encoded signal independently with respect to each other, as shown in a block 1631. As described with respect other embodiments herein, certain embodiments relate to outputting the first encoded signal and the second encoded signal via one or more wireless communication links. Other embodiments relate to outputting the first encoded signal and the second encoded signal via one or more wired communication links.

Referring to method 1700 of FIG. 17A, the method 1700 begins by selecting a first coding from among a plurality of codings based on a first media element type associated with a first media element among a plurality of media elements, as shown in a block 1710. The method 1700 continues by encoding the first of the plurality of media elements in accordance with the first of the plurality of codings thereby generating a first encoded signal, as shown in a block 1720.

The method 1700 then operates by selecting a second coding from among the plurality of codings based on a second media element type associated with a second media element among the plurality of media elements, as shown in a block 1730. The method 1700 continues by encoding the second of the plurality of media elements in accordance with the second of the plurality of codings thereby generating a second encoded signal, as shown in a block 1740.

The method 1700 then operates by outputting the first encoded signal and the second encoded signal independently with respect to each other, as shown in a block 1750. As described with respect other embodiments herein, certain embodiments relate to outputting the first encoded signal and the second encoded signal via one or more wireless communication links. Other embodiments relate to outputting the first encoded signal and the second encoded signal via one or more wired communication links.

Referring to method 1701 of FIG. 17B, the method 1701 begins by processing a display thereby identifying/generating a plurality of media elements therein/thereof, as shown in a block 1711.

The method 1701 then operates by identifying a plurality of characteristics respectively associated with the plurality of media elements, as shown in a block 1721. Certain of the media elements may have more than one characteristic associated therewith. Also, different respective media elements may have one or more commonly associated characteristics. That is to say, a first media element may have a first characteristic associated therewith, and a second media element may have the first characteristic also associated therewith (and/or may also have a second characteristic associated therewith).

The method 1701 continues by selectively encoding the plurality of media elements based on the plurality of characteristics thereby generating a plurality of encoded signals, as shown in a block 1731.

The method 1701 then operates by outputting the plurality of encoded signals independently with respect to each other, as shown in a block 1741. As described with respect other embodiments herein, certain embodiments relate to outputting the plurality of encoded signals via one or more wireless communication links. Other embodiments relate to outputting the plurality of encoded signals via one or more wired communication links.

It is also noted that the various operations and functions as described with respect to various methods herein may be performed within a wireless communication device, such as using a baseband processing module implemented therein (e.g., such as in accordance with the baseband processing module as described with reference to FIG. 2) and/or other components therein. For example, such a baseband processing module can perform any one or more of the various encoding and/or transcoding operations herein, including any other of the various operations that may operate cooperatively with or assist with such encoding and/or transcoding operations, in accordance with various aspects of the invention, and/or any other operations and functions as described herein, etc. or their respective equivalents.

It is noted that the various modules and/or circuitries (baseband processing modules and/or circuitries, encoding modules and/or circuitries, decoding modules and/or circuitries, etc., etc.) described herein may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The operational instructions may be stored in a memory. The memory may be a single memory device or a plurality of memory devices. Such a memory device may be a read-only memory (ROM), random access memory (RAM), volatile memory, non-volatile memory, static memory, dynamic memory, flash memory, and/or any device that stores digital information. It is also noted that when the processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. In such an embodiment, a memory stores, and a processing module coupled thereto executes, operational instructions corresponding to at least some of the steps and/or functions illustrated and/or described herein.

It is also noted that any of the connections or couplings between the various modules, circuits, functional blocks, components, devices, etc. within any of the various diagrams or as described herein may be differently implemented in different embodiments. For example, in one embodiment, such connections or couplings may be direct connections or direct couplings there between. In another embodiment, such connections or couplings may be indirect connections or indirect couplings there between (e.g., with one or more intervening components there between). Of course, certain other embodiments may have some combinations of such connections or couplings therein such that some of the connections or couplings are direct, while others are indirect. Different implementations may be employed for effectuating communicative coupling between modules, circuits, functional blocks, components, devices, etc. without departing from the scope and spirit of the invention.

Various aspects of the present invention have also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

Various aspects of the present invention have been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, various aspects of the present invention are not limited to such embodiments. It will be obvious to one of average skill in the art that various changes and modifications may be practiced within the spirit and scope of the invention, as limited only by the scope of the appended claims.

Mode Selection Tables:

TABLE 1

| 2.4 GHz, 20/22 MHz channel BW, 54 Mbps max bit rate | | | | | | | | | |
|---|---|---|---|---|---|---|---|---|---|
| Rate | Modulation | Code Rate | NBPSC | NCBPS | NDBPS | EVM | Sensitivity | ACR | AACR |
| 1 | Barker BPSK | | | | | | | | |
| 2 | Barker QPSK | | | | | | | | |
| 5.5 | CCK | | | | | | | | |
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 11 | CCK | | | | | | | | |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 2

| Channelization for Table 1 | |
|---|---|
| Channel | Frequency (MHz) |
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 3

Power Spectral Density (PSD) Mask for Table 1
PSD Mask 1

| Frequency Offset | dBr |
|---|---|
| −9 MHz to 9 MHz | 0 |
| +/−11 MHz | −20 |
| +/−20 MHz | −28 |
| +/−30 MHz and greater | −50 |

TABLE 4

5 GHz, 20 MHz channel BW, 54 Mbps max bit rate

| Rate | Modulation | Code Rate | NBPSC | NCBPS | NDBPS | EVM | Sensitivity | ACR | AACR |
|---|---|---|---|---|---|---|---|---|---|
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 5

Channelization for Table 4

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 6

2.4 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |

TABLE 6-continued 2.4 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 7

Channelization for Table 6

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 8

5 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 9 channelization for Table 8

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 10

5 GHz, with 40 MHz channels and max bit rate of 486 Mbps

| Rate | TX Antennas | ST Code Rate | Modulation | Code Rate | NBPSC |
|---|---|---|---|---|---|
| 13.5 Mbps | 1 | 1 | BPSK | 0.5 | 1 |
| 27 Mbps | 1 | 1 | QPSK | 0.5 | 2 |
| 54 Mbps | 1 | 1 | 16-QAM | 0.5 | 4 |
| 108 Mbps | 1 | 1 | 64-QAM | 0.666 | 6 |
| 121.5 Mbps | 1 | 1 | 64-QAM | 0.75 | 6 |
| 27 Mbps | 2 | 1 | BPSK | 0.5 | 1 |
| 54 Mbps | 2 | 1 | QPSK | 0.5 | 2 |
| 108 Mbps | 2 | 1 | 16-QAM | 0.5 | 4 |
| 216 Mbps | 2 | 1 | 64-QAM | 0.666 | 6 |
| 243 Mbps | 2 | 1 | 64-QAM | 0.75 | 6 |
| 40.5 Mbps | 3 | 1 | BPSK | 0.5 | 1 |
| 81 Mbps | 3 | 1 | QPSK | 0.5 | 2 |
| 162 Mbps | 3 | 1 | 16-QAM | 0.5 | 4 |
| 324 Mbps | 3 | 1 | 64-QAM | 0.666 | 6 |
| 365.5 Mbps | 3 | 1 | 64-QAM | 0.75 | 6 |
| 54 Mbps | 4 | 1 | BPSK | 0.5 | 1 |
| 108 Mbps | 4 | 1 | QPSK | 0.5 | 2 |
| 216 Mbps | 4 | 1 | 16-QAM | 0.5 | 4 |
| 432 Mbps | 4 | 1 | 64-QAM | 0.666 | 6 |
| 486 Mbps | 4 | 1 | 64-QAM | 0.75 | 6 |

TABLE 11

Power Spectral Density (PSD) mask for Table 10
PSD Mask 2

| Frequency Offset | dBr |
|---|---|
| −19 MHz to 19 MHz | 0 |
| +/−21 MHz | −20 |
| +/−30 MHz | −28 |
| +/−40 MHz and greater | −50 |

TABLE 12

Channelization for Table 10

| Channel | Frequency (MHz) | Country | Channel | Frequency (MHz) | County |
|---|---|---|---|---|---|
| 242 | 4930 | Japan | | | |
| 250 | 4970 | Japan | | | |
| 12 | 5060 | Japan | | | |
| 38 | 5190 | USA/Europe | 36 | 5180 | Japan |
| 46 | 5230 | USA/Europe | 44 | 5520 | Japan |
| 54 | 5270 | USA/Europe | | | |
| 62 | 5310 | USA/Europe | | | |
| 102 | 5510 | USA/Europe | | | |
| 110 | 5550 | USA/Europe | | | |
| 118 | 5590 | USA/Europe | | | |
| 126 | 5630 | USA/Europe | | | |
| 134 | 5670 | USA/Europe | | | |
| 151 | 5755 | USA | | | |
| 159 | 5795 | USA | | | |

What is claimed is:

1. An apparatus comprising:
a wireless communication interface; and
a processor configured to:
process media to identify a plurality of media elements of the media and a plurality of overlay types used to display the plurality of media elements on a first display;
select a plurality of encodings based on characteristics associated with the plurality of media elements and the plurality of overlay types;
encode the plurality of media elements using the plurality of encodings to generate a plurality of encoded media streams, wherein a first media element of the plurality of media elements undergoes encoding using a first encoding and a second media element of the plurality of media elements undergoes encoding using a second encoding; and transmit, via the wireless communication interface, the plurality of encoded media streams via a plurality of wireless communication channels to at least a second display for display thereon.

2. The apparatus of claim 1, wherein a third first media element of the plurality of media elements also undergoes encoding using the first encoding.

3. The apparatus of claim 1, wherein the wireless transmitter is further configured to:

transmit a first encoded media stream of the plurality of encoded media streams via a first wireless communication channel of the plurality of wireless communication channels to the second display for display thereon; and transmit a second encoded media stream of the plurality of encoded media streams via a second wireless communication channel of the plurality of wireless communication channels to a third display for display thereon.

4. The apparatus of claim 1 further comprising:

the wireless transmitter configured to transmit one encoded media stream of the plurality of encoded media streams via a first wireless communication channel of the plurality of wireless communication channels to the second display for display thereon and also via a second wireless communication channel of the plurality of wireless communication channels to the third display for display thereon.

5. The apparatus of claim 1 further comprising:

the wireless transmitter configured to transmit one encoded media stream of the plurality of encoded media streams via at least two wireless communication channels of the plurality of wireless communication channels to the second display for display thereon.

6. The apparatus of claim 1 further comprising:

the processor including a plurality of encoders configured to respectively to encode the plurality of media elements based on the plurality of encodings to generate the plurality of encoded media streams.

7. The apparatus of claim 6 further comprising:

each of the plurality of encoders configured respectively to encode a respective one of the plurality of media elements.

8. The apparatus of claim 1, wherein the plurality of wireless communication channels are included within a single communication network.

9. The apparatus of claim 1, wherein:

a first wireless communication channel of the plurality of wireless communication channels is included with a first communication network; and a second wireless communication channel of the plurality of wireless communication channels is included with a second communication network.

10. The apparatus of claim 1, wherein the encoder is further configured to:

encode one media element of the plurality of media elements based on a first of the plurality of encodings; and encode the one of the plurality of media elements based on a second of the plurality of encodings and based on feedback from the at least a second display.

11. The apparatus of claim 1, wherein the wireless transmitter is further configured to:

transmit initially one encoded media stream of the plurality of encoded media streams via a first wireless communication channel of the plurality of wireless communication channels to the at least a second display for display thereon; and transmit the one encoded media stream of the plurality of encoded media streams via a second wireless communication channel of the plurality of wireless communication channels to the at least a second display for display thereon based on feedback from the at least a second display.

12. The apparatus of claim 1, wherein the wireless transmitter is further configured to:

transmit initially one encoded media stream of the plurality of encoded media streams via a first of the plurality of wireless communication channels to the at least a second display for display thereon; and transmit the one encoded media stream of the plurality of encoded media streams via the first and a second of the plurality of wireless communication channels to the at least a second display for display thereon based on feedback from the at least a second display.

13. The apparatus of claim 1, wherein the plurality of media elements corresponding to at least one of text, graphics, image or photograph, video, audio, a user interactive feature, picture in picture, a gadget, a taskbar, and a background corresponding to the first display.

14. A method for execution by a wireless communication device, the method comprising:

processing media to identify a plurality of media elements of the media and a plurality of overlay types used to display the plurality of media elements on a first display;

selecting a plurality of encodings based on characteristics associated with the plurality of media elements and the plurality of overlay types;

encoding a plurality of media elements using the plurality of encodings to generate a plurality of encoded media streams, wherein a first media element of the plurality of media elements undergoes encoding using a first encoding and a second media element of the plurality of media elements undergoes encoding using a second encoding; and transmitting, via a wireless communication interface of the wireless communication device, the plurality of encoded media streams via a plurality of wireless communication channels to at least a second display for display thereon.

15. The method of claim 14, wherein a third first media element of the plurality of media elements also undergoes encoding using the first encoding.

16. The method of claim 14 further comprising:

wirelessly transmitting a first encoded media stream of the plurality of encoded media streams to a first of the plurality of encoded media streams via a first of the plurality of wireless communication channels to the second display for display thereon; and wirelessly transmitting a second encoded media stream of the plurality of encoded media streams to a second of the plurality of encoded media streams via a second of the plurality of wireless communication channels to a third display for display thereon.

17. The method of claim 14 further comprising:

wirelessly transmitting one encoded media stream of the plurality of encoded media streams via a first wireless communication channel of the plurality of wireless communication channels to the second display for display thereon and also via a second wireless communication channel of the plurality of wireless communication channels to the third display for display thereon.

18. The method of claim 14 further comprising:

wirelessly transmitting one encoded media stream of the plurality of encoded media streams via at least two wireless communication channels of the plurality of wireless communication channels to the second display for display thereon.

19. The method of claim 14 further comprising:

encoding one media element of the plurality of media elements based on a first of the plurality of encodings; and encoding the one of the plurality of media elements based on a second of the plurality of encodings and based on feedback from the at least a second display.

20. The method of claim 14 further comprising:

initially wirelessly transmitting one encoded media stream of the plurality of encoded media streams via a first wireless communication channel of the plurality of wireless communication channels to the at least a second display for display thereon; and wirelessly transmitting the one encoded media stream of the plurality of encoded media streams via a second wireless communication channel of the plurality of wireless communication channels to the at least a second display for display thereon based on feedback from the at least a second display.

21. The method of claim 14 further comprising:

initially wirelessly transmitting one encoded media stream of the plurality of encoded media streams via a first of the plurality of wireless communication channels to the at least a second display for display thereon; and wirelessly transmitting the one encoded media stream of the plurality of encoded media streams via the first and a second of the plurality of wireless communication channels to the at least a second display for display thereon based on feedback from the at least a second display.

22. The method of claim 14, wherein the plurality of media elements corresponding to at least one of text, graphics, image or photograph, video, audio, a user interactive feature, picture in picture, a gadget, a taskbar, and a background corresponding to the first display.

* * * * *

UNITED STATES PATENT AND TRADEMARK OFFICE
CERTIFICATE OF CORRECTION

| | | |
|---|---|---|
| PATENT NO. | : 8,897,377 B2 | Page 1 of 1 |
| APPLICATION NO. | : 13/220601 | |
| DATED | : November 25, 2014 | |
| INVENTOR(S) | : Dougherty, III et al. | |

It is certified that error appears in the above-identified patent and that said Letters Patent is hereby corrected as shown below:

In the claims

Col. 35, lines 36-37, in claim 6: replace -- "encoders configured to respectively to encode" with -- encoders configured respectively to encode --

Signed and Sealed this
Tenth Day of May, 2016

Michelle K. Lee
*Director of the United States Patent and Trademark Office*